(12) United States Patent
Kanduri et al.

(10) Patent No.: US 10,591,044 B2
(45) Date of Patent: Mar. 17, 2020

(54) SYSTEMS AND METHODS FOR MONITORING BELT TENSION AND DETERMINING BELT LIFESPAN IN A TRANSPORT REFRIGERATION UNIT

(71) Applicant: THERMO KING CORPORATION, Minneapolis, MN (US)

(72) Inventors: Srikanth Kanduri, Hyderabad (IN); Swanand Umesh Bhargav, Ambernath (IN); Shivamurthi Gouda Kotagi, Bangalore (IN); Sriram Krishnamoorthy, Salem (IN); Akhil Ramesh Hamsagar, Bangalore (IN); Eanna Padraic Connolly, Galway (IE)

(73) Assignee: Thermo King Corporation, Minneapolis, MN (US)

( * ) Notice: Subject to any disclaimer, the term of this patent is extended or adjusted under 35 U.S.C. 154(b) by 309 days.

(21) Appl. No.: 15/800,968

(22) Filed: Nov. 1, 2017

(65) Prior Publication Data

US 2018/0119790 A1　　May 3, 2018

Related U.S. Application Data

(60) Provisional application No. 62/415,646, filed on Nov. 1, 2016.

(51) Int. Cl.
*F16H 57/01* (2012.01)
*F16H 7/12* (2006.01)
*G05B 23/02* (2006.01)

(52) U.S. Cl.
CPC .............. *F16H 57/01* (2013.01); *F16H 7/12* (2013.01); *F16H 2057/018* (2013.01);
(Continued)

(58) Field of Classification Search
CPC ...... F16H 57/01; F16H 7/12; F16H 2057/018; G05B 23/0235; G05B 23/0283; G05B 2219/2654; G07C 5/0808
(Continued)

(56) References Cited

U.S. PATENT DOCUMENTS 4,705,922 A * 11/1987 Seeger ................. H01H 35/147
200/61.45 M
6,523,400 B1 * 2/2003 Ahmed ............... G01M 13/023
73/114.77
(Continued)

FOREIGN PATENT DOCUMENTS

CN 　　　203329833 U * 12/2013
DE 　102004009129 A1 * 9/2005 .............. F01L 1/024
(Continued)

OTHER PUBLICATIONS

"Magnetic Displacement Sensors HMC1501/1512"; Honeywell, Copyright 2008, 8 pages.

*Primary Examiner* — Tuan C To
(74) *Attorney, Agent, or Firm* — Hamre, Schumann, Mueller & Larson, P.C.

(57) ABSTRACT

Methods and systems for monitoring belt tension and determining belt lifespan in a TRS are disclosed. An embodiment of a self-tensioner can include a sensor connected to a self-tensioner in a belt driven system and a magnet that passes over the sensor to generate a signal. The sensor detects the signal, and the signal in conjunction with an angle of the magnet is converted into a voltage value. The method can include a controller connected to the self-tensioner, the controller converts the voltage value into a tension value, and stores the tension value among a plurality of premeasured tension values in a memory, where the controller compares the tension value and the plurality of
(Continued)

premeasured tension values to determine a belt tension condition of the belt in the belt-driven system.

20 Claims, 16 Drawing Sheets

(52) U.S. Cl.
CPC ...... *G05B 23/0235* (2013.01); *G05B 23/0283* (2013.01); *G05B 2219/2654* (2013.01)

(58) Field of Classification Search
USPC ...................................................... 701/29.1
See application file for complete search history.

(56) References Cited

U.S. PATENT DOCUMENTS

| | | | |
|---|---|---|---|
| 7,419,026 B2 * | 9/2008 | Midorikawa | B60R 22/18 180/268 |
| 7,835,887 B2 | 11/2010 | Abbata et al. | |
| 7,882,394 B2 | 2/2011 | Hosek et al. | |
| 7,894,934 B2 | 2/2011 | Wallace et al. | |
| 8,657,105 B2 | 2/2014 | Twigger et al. | |
| 8,858,374 B2 | 10/2014 | Townsend | |
| 2002/0194935 A1 | 12/2002 | Clarke et al. | |
| 2004/0154413 A1 | 8/2004 | Coy et al. | |
| 2005/0288898 A1 | 12/2005 | Le | |
| 2008/0139352 A1 * | 6/2008 | Sato | F16H 7/0848 474/109 |
| 2009/0011881 A1 * | 1/2009 | Lehtovaara | F16H 7/1281 474/135 |
| 2009/0303065 A1 | 12/2009 | Lipowski | |
| 2014/0201571 A1 | 7/2014 | Hosek et al. | |
| 2014/0217792 A1 * | 8/2014 | Meyer | H02H 7/122 297/284.8 |
| 2015/0057117 A1 * | 2/2015 | Antchak | F16H 7/12 474/109 |
| 2015/0126315 A1 * | 5/2015 | Farewell | F02B 67/06 474/109 |
| 2015/0170109 A1 * | 6/2015 | Sakuragi | B65G 43/02 705/7.25 |
| 2015/0191149 A1 * | 7/2015 | Isayama | B60R 22/1954 280/806 |
| 2017/0024939 A1 * | 1/2017 | Wonderlich | B65G 43/02 |

FOREIGN PATENT DOCUMENTS

| | | | | |
|---|---|---|---|---|
| EP | 1225371 A2 * | 7/2002 | | F16H 9/12 |
| KR | 101495491 B1 * | 2/2015 | | |

* cited by examiner

SYSTEMS AND METHODS FOR MONITORING BELT TENSION AND DETERMINING BELT LIFESPAN IN A TRANSPORT REFRIGERATION UNIT

FIELD

This disclosure relates generally to a transport refrigeration system (TRS). More specifically, this disclosure relates systems and methods for monitoring belt tension and determining belt lifespan in a transport refrigeration unit (TRU).

BACKGROUND

A transport refrigeration system (TRS) is generally used to control one or more environmental conditions such as, but not limited to, temperature, humidity, and/or air quality of a refrigerated transport unit. A refrigerated transport unit is commonly used to transport perishable items such as produce, frozen foods, and meat products. Generally, the refrigerated transport unit includes a transport unit and a TRS. Examples of transport units include, but are not limited to, a trailer, a container on a flat car, an intermodal container, a truck a boxcar, or other similar transport units. The TRS can include a transport refrigeration unit (TRU) that is attached to the transport unit to control one or more environmental conditions (e.g., temperature, humidity, air quality, etc.) of a particular space (e.g., a cargo space, a passenger space, internal space, etc.) (generally referred to as a "conditioned space"). The TRU can include, without limitation, a compressor, a condenser, an expansion valve, an evaporator, and fans or blowers to control the heat exchange between the air inside the conditioned space and the ambient air outside of the refrigerated transport unit.

SUMMARY

This disclosure relates generally to a transport refrigeration system (TRS). More specifically, this disclosure relates to systems and methods for monitoring belt tension and determining belt lifespan in a transport refrigeration unit (TRU).

Monitoring belt tension and determining belt lifespan in a TRU can identify and/or predict belt failure in the unit. Monitoring belt tension can be used to predict an estimated remaining belt life associated with the belt in the unit. Obtaining information associated with the belt lifespan may minimize unit down time (e.g., non-operating time). Monitoring belt tension and/or an associated belt lifespan can provide information to identify an optimized belt tension. Such information may be used to improve drive efficiency, which may reduce costs associated with replacements and reduce repair/maintenance time, thereby optimizing costs associated with running the system.

A self-tensioner can provide belt tension. The self-tensioner disclosed herein can reduce a load on the brush bearing by distributing the load via tensioner geometry, among other features. Tensioner geometry is a particular arrangement of pulleys and/or components within a tensioner system, to provide optimum tension to the belt. Additionally, or alternatively, the self-tensioner disclosed herein can include a lengthened tensioner arm to keep a spring at a constant stiffness and/or reduce spring stiffness by keeping the self-tensioner arm length constant. The self-tensioner can be adaptable (e.g., retrofitted) for use in other units and/or adapted to other products, such as a component of a blower side belt drive system.

The self-tensioner disclosed herein can reduce the force upon the brush bearing, which can serve to support and/or protect the tensioner arm and/or other components of the self-tensioner system, thereby increasing the lifespan of the self-tensioner by decreasing wear. The self-tensioner may provide accurate, reliable, and/or customized tension in a belt drive system for an exceptional time.

As described herein, a self-tensioner for a belt drive system in a TRU includes a sensor on a base of the self-tensioner to detect a signal, the signal indicating an amount of movement of a tensioner arm of the self-tensioner. The signal in conjunction with an angle of a magnet is converted into a voltage value, which can be used to determine a tension value (e.g., a tension associated with a belt in the self-tensioner). The tension value is based on a voltage value with respect to degrees (e.g., theta) of a magnet. A belt tension condition and/or a belt lifespan can be determined based on the tension value. The belt tension condition can be an error belt tension condition or a normal belt tension condition (e.g., non-error condition) of the belt in the belt drive system. The tension value can be compared to a threshold that is based on a predetermined set value and/or historic tension values with a corresponding belt lifespan to determine the belt tension condition and/or the belt lifespan.

In an embodiment, a self-tensioner system for monitoring belt tension and belt failure includes a sensor connected to a self-tensioner in a belt driven system that detects, from a self-tensioner, a signal and angle of a magnet which generates a voltage value. A controller connected to the self-tensioner converts the voltage value into a tension value associated with a belt in the belt driven system. The controller stores the tension value among a plurality of premeasured tension values in a memory, and the controller compares the tension value and the plurality of premeasured tension values to determine a belt tension condition of the belt in the belt-driven system.

In an embodiment, a method for monitoring belt tension includes detecting a signal and an angle of a magnet collected from a sensor connected to a self-tensioner, the signal and angle of the magnet form a voltage value. The method includes converting the voltage value into a tension value, and storing, via a controller, the tension value associated with the self-tensioner. The method includes generating a data curve for remaining belt lifespan via historical tension values and time data. The method can further include corresponding the tension value to a point on the data curve, and predicting a belt lifespan of the self-tensioner based on the corresponding point on the data curve.

In an embodiment, a self-tensioner system includes a sensor connected to a self-tensioner in a belt driven system that receives a signal from a tensioner arm of the self-tensioner, the signal is a voltage value in conjunction with an angle of a magnet. The signal is converted into a tension value associated with a belt in the belt driven system. The system further includes a controller connected to the self-tensioner that stores the tension value among a plurality of historic tension values and corresponding belt lifespan in a memory. The controller compares the tension value and a threshold to determine a belt tension condition of the belt driven system. The controller compares the tension value and the historic tension values to determine a corresponding lifespan of the belt in the belt-driven system.

BRIEF DESCRIPTION OF THE DRAWINGS

References are made to the accompanying drawings that form a part of this disclosure, and which illustrate the embodiments in which the systems and methods described in this Specification can be practiced. Like reference numbers represent like parts throughout.

FIG. 3A illustrates a back view of a self-tensioner for a belt drive system in a TRU, according to an embodiment. FIG. 3B illustrates a front view of a self-tensioner for a belt drive system in a TRU, according to an embodiment. FIG. 3C illustrates a cut-away view of a self-tensioner for a belt drive system in a TRU, according to an embodiment.

FIG. 4A illustrates a front view of a self-tensioner for a belt drive system in a TRU, according to an embodiment. FIG. 4B illustrates a back view of a self-tensioner for a belt drive system in a TRU, according to an embodiment. FIG. 4C illustrates a side cut-away view of a self-tensioner for a belt drive system in a TRU, according to an embodiment.

FIG. 6A illustrates a back view of a self-tensioner for a belt drive system in a TRU, according to an embodiment. FIG. 6B illustrates a off-set side view of a self-tensioner for a belt drive system in a TRU, according to an embodiment. FIG. 6C illustrates a side view of a self-tensioner for a belt drive system in a TRU, according to an embodiment. FIG. 6D illustrates a side cut-away view of a self-tensioner for a belt drive system in a TRU, according to an embodiment.

FIG. 7A illustrates a back view of a self-tensioner with an idler assembly for a belt drive system in a TRU, according to an embodiment. FIG. 7B illustrates an off-set side view of a self-tensioner with an idler assembly for a belt drive system in a TRU, according to an embodiment. FIG. 7C illustrates a side view of a self-tensioner with an idler assembly for a belt drive system in a TRU, according to an embodiment. FIG. 7D illustrates a side cut-away view of a self-tensioner with an idler assembly for a belt drive system in a TRU, according to an embodiment.

DETAILED DESCRIPTION

Figure 1:
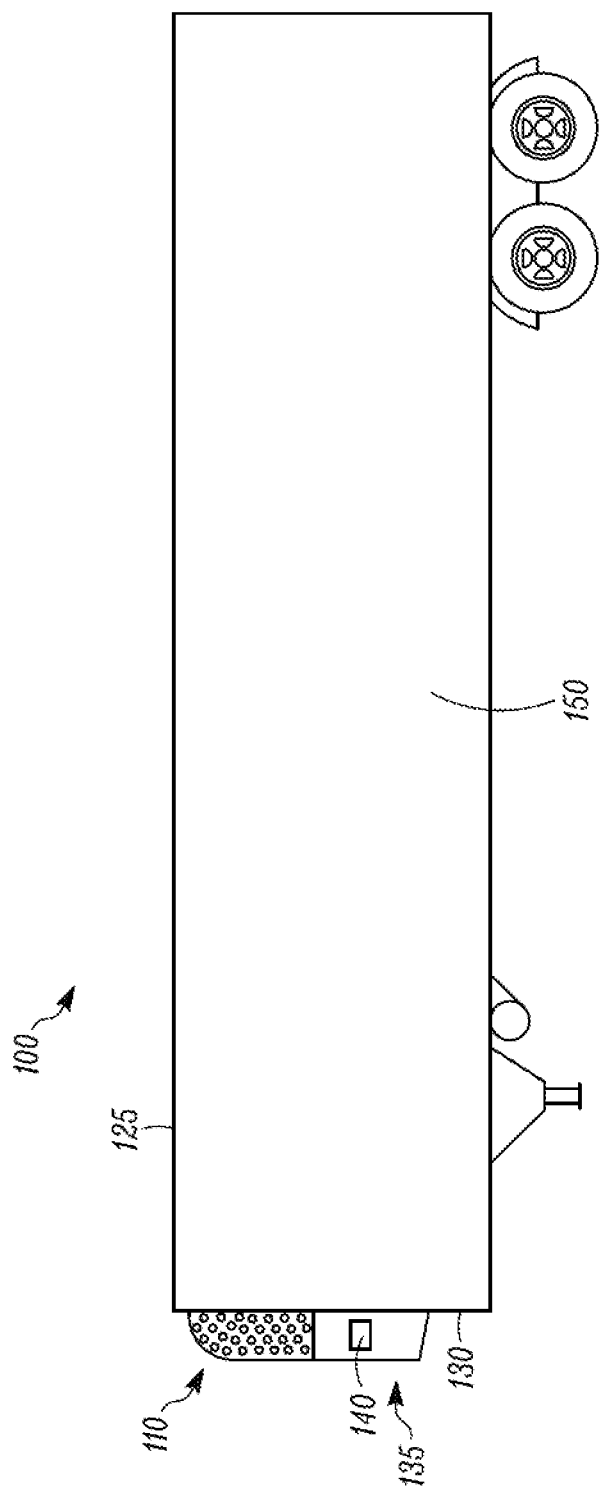
FIG. 1 illustrates a side view of a refrigerated transport unit, according to an embodiment.

This disclosure relates generally to a TRS. More specifically, this disclosure relates to a self-tensioner for a belt drive system in a TRU and a method of providing tension in a belt system of a TRU.

A TRS is generally used to control one or more environmental conditions such as, but not limited to, temperature, humidity, and/or air quality of a refrigerated transport unit. Examples of transport units include, but are not limited to, a trailer, a container on a flat car, an intermodal container, a truck, a boxcar, or other similar transport units. A refrigerated transport unit can be used to transport perishable items such as, but not limited to, pharmaceuticals, produce, frozen foods, and meat products.

As disclosed herein, a TRS can include a TRU which is attached to a transport unit to control one or more environmental conditions (e.g., temperature, humidity, air quality, etc.) of an interior space of the transport unit. The TRU can include, without limitation, a compressor, a condenser, an expansion valve, an evaporator, and one or more fans or blowers to control the heat exchange between the air within the interior space and the ambient air outside of the refrigerated transport unit.

A "transport refrigeration system" (TRS) includes, for example, a refrigeration system for controlling the refrigeration of an interior space of a refrigerated transport unit. The TRS may include a vapor-compressor type refrigeration system, a thermal accumulator type system, or any other suitable refrigeration system that can use refrigerant, cold plate technology, or the like.

A "refrigerated transport unit" includes, for example, a transport unit having a TRS.

Embodiments of this disclosure may be used in any suitable environmentally controlled transport apparatus, such as, but not limited to, a shipboard container, an air cargo cabin, and an over the road truck cabin.

The TRS includes a prime mover (PM) engine. The PM can be an electric motor, such as in standby mode. In some embodiments, the PM can drive a belt system which in turn can provide mechanical energy to one or more components of the TRS. In particular, the belt system can direct mechanical energy to, for example, an alternator (not shown) of the TRS, one or more fans or blowers of the TRS, and a compressor of the TRS. That is, the belt system can be coupled to the PM at one end and can be coupled to the alternator and the compressor at the other end. The belt system includes a belt that needs a certain tension to operate. For example, a blower side belt system can use an auto-tensioner to maintain a certain belt tension.

A belt drive tensioner can be, for example, a pulley mounted to a spring mechanism and/or to an adjustable pivot point that is used to maintain a constant tension on a belt. Some tensioners can include a coil spring that applies an amount of force against the belt to keep it tight. However, the tensioner may also provide an amount of slack so as to absorb and cushion shock loads on the belt that occur when the compressor cycles on and/or off. Tensioners can include brush bearing to constrain motion to a desired motion and/or reduce friction between moving parts (e.g., belt, etc.).

Tensioners can have a spring stiffness that may be too high for the corresponding length of tensioner arm, which in turn can cause rapid belt tension decay. Setting the belt tension of a tensioner much higher than required may cause the belt to eventually decay to the required belt tension value as the belt stretches and wears out. As a result, the tensioner can experience rapid brush bearing wear due to the high bearing loads. The brush bearing is a machine element that supports another part/element of the tensioner system. The brush bearing constrains relative motion to a desired motion (e.g., rotation about a fixed axis) and/or can prevent a particular motion. The brush bearing is associated with the portion of the tensioner in motion (e.g., pivoting).

Improper tension is problematic in a belt driven system. Too little tension may permit the belt to slip off the assembly and/or squeal due to improper positioning. Belt slippage may cause the belt to run hot, thereby aging the belt prematurely. Alternatively, too high of tension on the belt may overload the belt and/or associated components, as discussed above. In some examples, too high of tension may overload the tensioner arm and/or shaft bearings on an alternator or motor, which can cause premature failure of the components. Improper tension may cause wear that may even affect the prime mover (PM), the bearing for the engine or a standby motor. In some instances, improper tension can affect the bearings in the motor, such as the engine shaft bearing. Improper tension may affect any bearing on the drive system.

Tensioners can be arranged such that spring force and resultant force of the belt tension are added together (e.g., additive in nature), which may result in an increased reaction force at the pivot brush bearing. The increased reaction force can cause high contact pressures along the brush bearing. Some tensioners magnify the load on the brush bearing, which can cause rapid wear or damage to the brush bearing. Magnification of the load on the brush bearing may result in a decreased tensioner life-span. The contact pressure upon the brush bearing can be too high, which cause accelerated wear and and/or a decreased functional life-span and/or failure.

Additionally, some tensioners can experience increased amounts of corrosion due to abrasions from foreign particulate matter getting lodged in the brush bearing. Some tensioner assemblies expose the brush bearing on the tensioner to the atmosphere. The exposed brush bearing can allow foreign particulate matter, such as dust, to accumulate around the brush bearing, which accelerates wear. The high rate of wear to the brush bearing is due to increased bearing loads, and/or increased abrasions from environmental exposure, and can cause the tensioner to seize in the system. Tensioner seizure can be an arrest (e.g., stop) of the tensioner. Tensioner seizure may cause the tensioner to fail to perform its function, which can damage the system and/or lead to numerous warranty claims, which can result in loss of production and/or revenue.

To avoid improper belt tension settings, monitoring measurements associated with the belt in the belt drive system would be beneficial to determine proper belt tension. A self-tensioner for a belt drive system in a TRU is disclosed herein. More particularly, systems and methods for monitoring belt tension and determining belt lifespan in a TRU are disclosed herein. The systems and methods described herein are directed to a self-tensioner system that can identify and/or predict belt failure in the unit based on tension value, which is beneficial to prevent belt failure and/or damage. Monitoring belt tension and determining a belt lifespan can minimize unit downtimes due to belt replacement and/or provide optimized belt tension information for improving efficiency of the belt driven system.

The brush bearing can support and/or protect additional elements/components of the self-tensioner system. The self-tensioner disclosed herein can reduce the force(s) on the brush bearing of the self-tensioner and/or seal the self-tensioner from the environment. Thus, reducing the force and a resulting wear and/or damage to the brush bearing that is associated with motion of the tensioner arm of the self-tensioner, can increase the lifespan of the self-tensioner and provide proper tension to the belt-drive system.

Additionally, including a seal in the self-tensioner can prevent foreign particulate matter from contacting the brush bearing of the self-tensioner. Preventing environmental contamination can avoid damage to the self-tensioner, in particular to the brush bearing, and increase the life-span of the self-tensioner.

The self-tensioner disclosed herein can reduce a load on the brush bearing by distributing the load via tensioner geometry, among other features. Tensioner geometry is a particular arrangement of pulleys and/or components within a tensioner system, to provide optimum tension to the belt. Additionally, or alternatively, the self-tensioner disclosed herein can include a lengthened tensioner arm to keep the spring at a constant stiffness and/or reduce spring stiffness by keeping the self-tensioner arm length constant. The self-tensioner can be adaptable (e.g., retrofitted) for use in other units and/or adapted to other products, such as a component of a blower side belt drive system.

The self-tensioner disclosed herein can reduce the force upon the brush bearing, which can serve to support and/or protect the tensioner arm and/or other components of the self-tensioner system, thereby increasing the lifespan of the self-tensioner by decreasing wear. The self-tensioner may provide accurate, reliable, and/or customized tension in a belt drive system for an exceptional time.

FIG. 1 illustrates a side view of a TRS 100 for a transport unit 125, according to some embodiments. The illustrated transport unit 125 is a trailer-type transport unit. Embodiments as described in this Specification can be used with other types of transport units. For example, the transport unit 125 can represent a container (e.g., a container on a flat car, an intermodal container, etc.), a truck, a boxcar, or other similar type of transport unit including an environmentally controlled interior space.

The TRS 100 is configured to control one or more environmental conditions such as, but not limited to, temperature, humidity, and/or air quality of an interior space 150 of the transport unit 125. In some embodiments, the interior space 150 can alternatively be referred to as the conditioned space 150, the cargo space 150, the environmentally controlled space 150, or the like. In particular, the TRS 100 is configured to transfer heat between the air inside the interior space 150 and the ambient air outside of the transport unit 125.

The interior space 150 can include one or more partitions or internal walls (not shown) for at least partially dividing the interior space 150 into a plurality of zones or compartments, according to some embodiments. It is to be appreciated that the interior space 150 may be divided into any number of zones and in any configuration that is suitable for refrigeration of the different zones. In some examples, each of the zones can have a set point temperature that is the same or different from one another.

The TRS 100 includes a TRU 110. The TRU 110 is provided on a front wall 130 of the transport unit 125. The TRU 110 can include a prime mover (e.g., an internal combustion engine) (not shown) that provides mechanical power directly to a component (e.g., a compressor, etc.) of the TRS 100, via for example, a belt drive system (not shown). In some embodiments, the PM engine is not specifically configured for the TRS 100, but can be a non-industrial internal combustion engine, such as an automotive internal combustion engine.

The TRU 110 includes a programmable TRS Controller 135 that includes a single integrated control unit 140. It is to be appreciated that, in some embodiments, the TRS controller 135 may include a distributed network of TRS control elements (not shown). The number of distributed control elements in a given network can depend upon the particular application of the principles described in this Specification. The TRS Controller 135 can include a processor, a memory, a clock, and an input/output (I/O) interface (not shown). The TRS Controller 135 can include fewer or additional components.

The TRU 110 also includes a heat transfer circuit. Generally, the TRS Controller 135 is configured to control a heat transfer cycle (e.g., controlling the heat transfer circuit of the TRU 110) of the TRS 100. In one example, the TRS Controller 135 controls the heat transfer cycle of the TRS 100 to obtain various operating conditions (e.g., temperature, humidity, air quality etc.) of the interior space 150.

Figure 2:
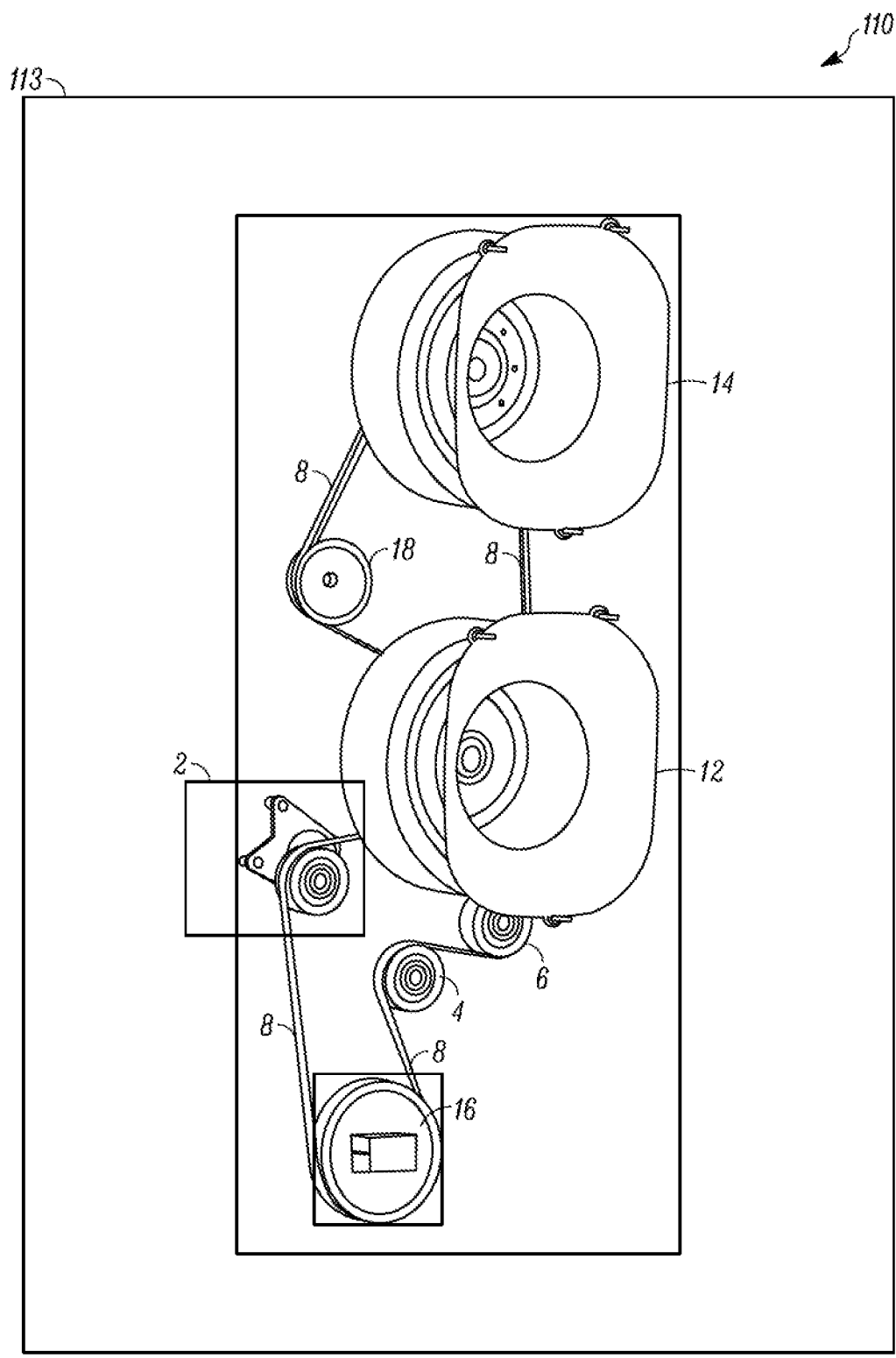
FIG. 2 illustrates a diagram of a self-tensioner in a blower side belt system of a TRU, according to an embodiment.

FIG. 2 illustrates a diagram of a blower side belt driven system 113 of a TRU 110.

The belt driven system 113 includes a self-tensioner 2, a belt 8, a second tensioner 16, a sheave 18, a plurality of pulleys 4, 6, and a plurality of blowers 12, 14, a compressor (not shown), an alternator (not shown), etc. In some embodiments, the belt driven system 113 can include additional or fewer components than illustrated in FIG. 2.

The belt 8 is a loop that can be formed of a flexible or stiff material and is used to mechanically link two or more rotating shafts, including the pulleys 4, 6. The belt 8 can be used as a source of motion to transmit mechanical energy from the prime mover (PM) engine to components in the belt driven system (e.g., the pulleys 4, 6; the plurality of blowers 12, 14). The belt 8 is looped over the plurality of pulleys 4, 6, to drive and/or reverse the pulleys 4, 6, such that the direction of the drive shafts are reversed and the belt 8 can transmit energy. The transmitted energy from the belt 8 can activate a fan wheel in the plurality of blowers 12, 14 for heating and/or cooling purposes.

Figure 3A:
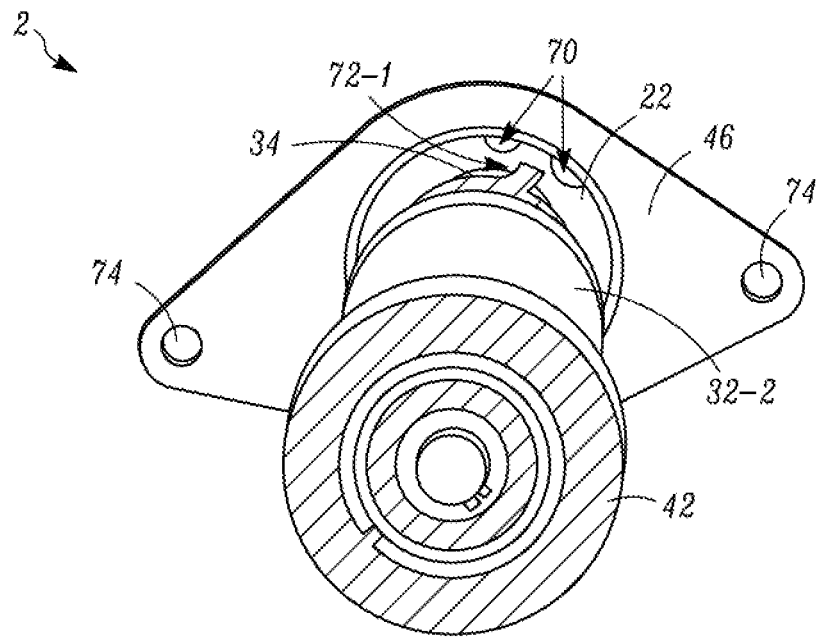
FIGS. 3A-3C illustrate different perspective views of self-tensioner for a belt drive system in a in a TRU, according to an embodiment.
Figure 3B:
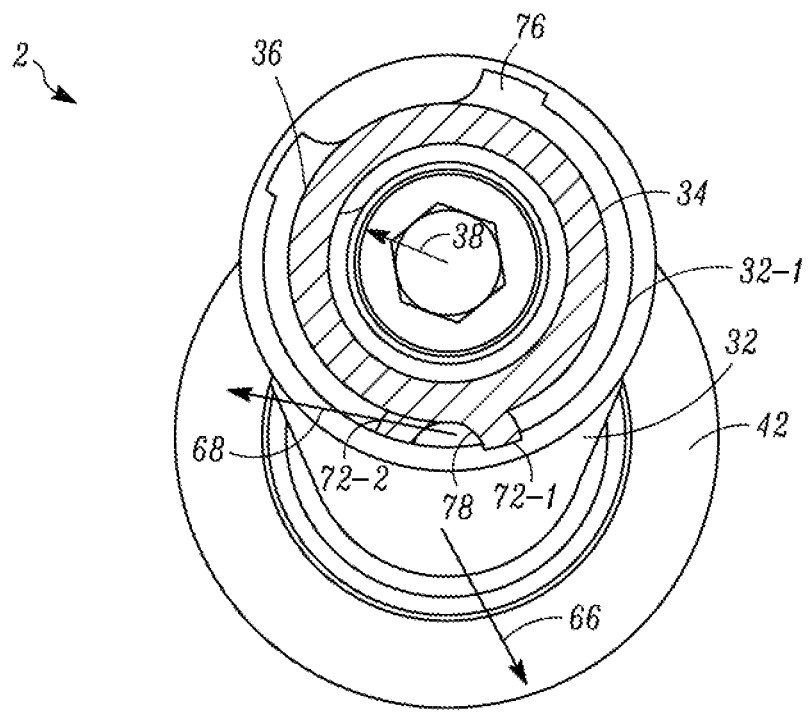
Figure 3C:
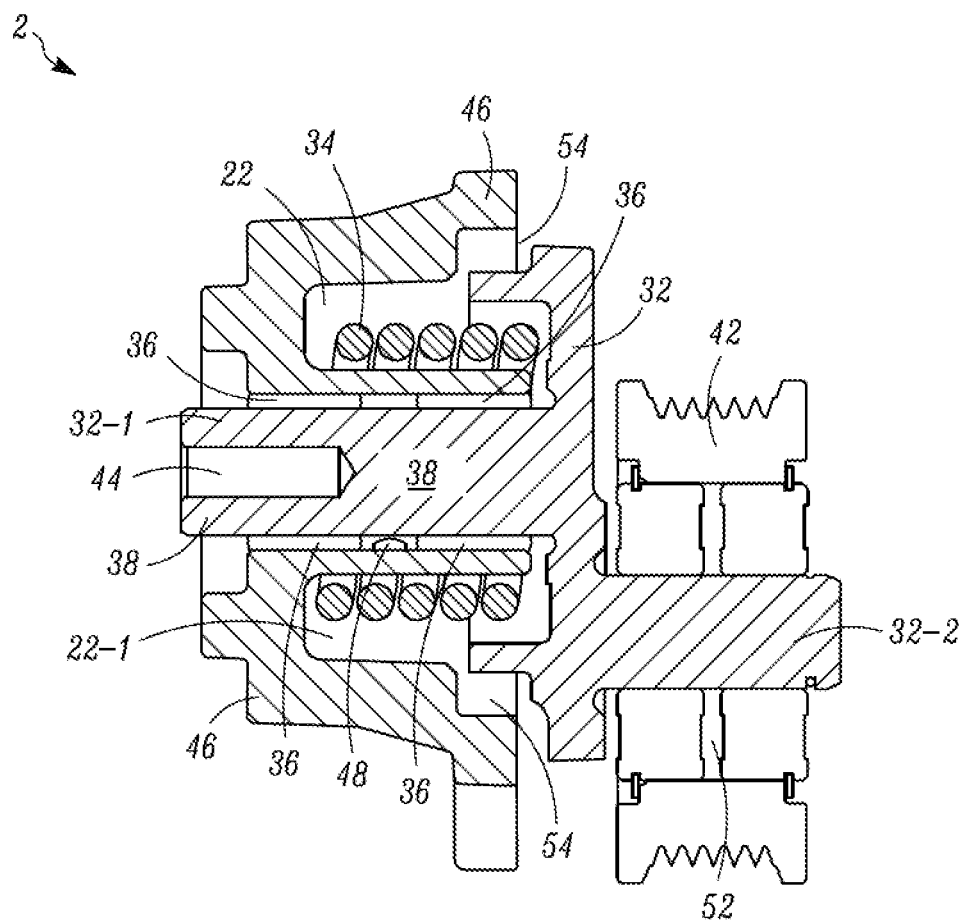

FIGS. 3A-3C illustrate different perspective views of the self-tensioner 2 shown in FIG. 2, according to one embodiment. The self-tensioner 2 includes a base member 46, a spring 34, a tensioner arm 32, and an idler assembly 42. The tensioner arm 32 includes a first portion 32-1 and a second portion 32-2, generally referred to herein as tensioner arm 32.

A first surface 22 of the base member 46 can have a crevice 22-1 such that the spring 34 can be placed within the first surface 22 of the base member 46. In some embodiments, the spring 34 can be a torsion spring. Alternatively, the spring 34 can be a soft spring that minimizes belt tension decay and/or applies decreased belt tension values. In some embodiments, the spring 43 (e.g., torsion spring) is positioned at least partially within the base member 46. For example, a first end of the spring 34 can be in contact with the first surface 22 of the base member 46. The base member 46 can include a plurality of holes 74 on the peripheral of the base member 46 to aid in the attachment of the self-tensioner 2 to a different component.

The second portion of the tensioner arm 32-2 is connected to an idler assembly 42. The idler assembly 42 can provide pivoting support to the self-tensioner 2. A belt (not shown) can rotate about the idler assembly 42.

The first portion of the tensioner arm 32-1 can be associated with a brush bearing 36 and the spring 34 positioned at least partially inside the base member 46. For example, the first portion of the tensioner arm 32-1 is nestled within a hollow of the spring 34 (e.g., center of the helical coil), such that the base member 46 houses at least a portion of the spring 34 and the first portion of the tensioner arm 32-1 simultaneously. As discussed further herein, the spring 34 acts between the base member 46 and tensioner arm 32.

A set of cast bosses 70 are fixed to the base member 46. For example, the cast bosses 70 can be located inside the first surface 22, such as the crevice 22-1, of the base member 46. The set of cast bosses 70 can lock the spring 34 in place relative to the base member 46, which can reduce and/or redirect force(s). Locking a leg 72-1 of the spring 34 into placement in the base member 46 can provide a particular amount of tension to the torsion spring 34. That is, the spring 34 is subject to twisting about an axis (e.g., center of the helical coil, hollow).

In some embodiments, a leg 72-1 of the spring 34 can be locked between the set of cast bosses 70, causing movement of the spring 34 to be arrested. In the embodiment, shown in FIG. 3A, the spring 34 includes the leg 72-1 of the spring 34, the leg 72-1 being a first portion of the spring 34. The spring 34 includes two legs 72-1, 72-2, and at least one leg 72-1 which is locked into place inside the base member 46 via the cast bosses 70. For example, when the spring 34 is a torsion spring, the leg 72 can be a helical torsion spring, a first end (e.g., beginning portion) of the spring 34 is the leg 72-1 and a second end (e.g., end portion) of the spring 34 is the second leg 72-2. As discussed further herein, in some embodiments, the leg 72-1 can be locked into place, arresting movement of the spring 34, which can reduce contact pressure upon the tensioner arm 32.

FIG. 3B illustrates a front view of the self-tensioner 2, according to an embodiment. The self-tensioner 2 depicted in FIG. 3B shows a front view of the self-tensioner 2 without the base member 46. FIG. 3B includes similar components to FIG. 3A, including the spring 34, the tensioner arm 32, and the idler assembly 42.

As previously discussed with respect to FIG. 3A, a leg 72-1 of the spring 34 is locked into place in the base member 46 which can arrest movement of the spring. As shown in FIG. 3B, when the leg 72-1 of the spring 34 is locked into place, the spring 34 has been rotated from an initial position 76 to a locked position 78. The locked position 78 of the spring 34 changes the spring force 68. The spring force 68 has an opposite force when the leg 72 is in a locked position 78 than when the leg 72-1 is in an initial position 76.

As shown in FIG. 3B, the first portion of the tensioner arm 32-1 is encircled by a brush bearing 36. The brush bearing 36 separates the pivot of the tensioner arm 32 from the torsion spring 34. The brush bearing 36 and the pivot of the tensioner arm 32 forms a pivot brush bearing 38. The pivot brush bearing 38 is an area of contact stress from operation of the belt-drive system. That is, rotation of a belt (not shown) around an idler assembly can cause contact stress upon the tensioner arm 32 and the associated brush bearing 36.

The spring force 68 and the resultant of belt tension 66 act on the pivot brush bearing 38, the force of which is transferred to the brush bearing 36 that is associated with the first portion of the tensioner arm 32-1. As illustrated in FIG. 3B, the spring force 68 and the resultant of the belt tension 66 are opposite forces, thereby decreasing the resultant at pivot brush bearing 38. In other words, the spring force 68 is no longer an additive force with the resultant of the belt tension 66 exerting twice the force upon the pivot brush bearing 38. The spring force 68 and the resultant of the belt tension 66 are opposite forces, which are additive when acting upon the brush bearing 36 and/or the tensioner arm 32. That is, the force upon the brush bearing 36 and the tensioner arm 32 is thus reduced upon the spring force 68 and the resultant of the belt tension 66 no longer being additive. Reducing the resultant at pivot brush bearing 38 thereby decreases the force on the brush bearing 36 that is associated with the tensioner arm 32. Decreasing force acting upon the brush bearing 36 can aid in supporting movement of the tensioner arm 32, thereby decreasing contact stress on the tensioner arm 32. Decreasing the contact pressure (e.g., stress) and/or wear on the brush bearing 36 and/or tensioner arm 32 can increase the life-span of the self-tensioner 2.

In some embodiments, the opposite forces of the spring force 68 and the resultant of belt tension 66 reduces force exerted on the brush bearing 36, which can decrease deflection on the idler assembly 42. Decreasing deflection on the idler assembly 42 can aid in belt alignment. For example, the spring 34 can bend applied stresses. The reduction of force exerted on the brush bearing 36 can create a decreased deflection on the idler assembly 42 and assist with belt alignment (e.g. 8 in FIG. 2). The reduction in forces can increase the life-span of the self-tensioner 2 and associated components because the components may not be subject to increased force(s), resulting in accelerated breakdown. That is, decreasing force(s) acting upon the components (e.g., brush bearing 36, tensioner arm 32) can increase the life-span of the self-tensioner 2.

FIG. 3C illustrates a cut-away view of a self-tensioner in a TRU, according to an embodiment. As previously discussed with respect to FIGS. 3A and 3B, the self-tensioner 2 includes the base member 46, the spring 34 within the base member 46, a first portion of an tensioner arm 32-1 within a hollow of the spring 34, and a second portion of the tensioner arm 32-2 associated with the idler assembly 42.

In an embodiment, a bolt 44 is threaded through a center of the base member 46 to a pivot arm of the tensioner arm 32, in particular the first portion of the tensioner arm 32-1. The bolt 44, in some embodiments, can be a different attachment member, such as a screw or the like. The bolt 44 threaded from the base member 46 to the tensioner arm 32 secures the base member 46 to the tensioner arm 32. In some embodiments, the pivot shaft diameter of the tensioner arm 32 can be increased. For example, the pivot shaft diameter of the tensioner arm 32 can be increased from approximately 18 mm to approximately 22 mm. In some embodiments, the pivot shaft can be at least 25 mm in diameter. Increasing the pivot shaft diameter of the tensioner arm 32 can reduce contact pressure upon the tensioner arm 32.

As illustrated in FIG. 3C, a brush bearing 36 separates the pivot of the tensioner arm 32 from the torsion spring 34. The brush bearing 36 and the pivot of the tensioner arm 32 forms a pivot brush bearing 38. The pivot brush bearing 38 is located adjacent and/or in close proximity to the idler assembly 42. An oil hole 48 is formed between each brush bearing 36. The oil hole 48 can permit lubrication to the pivot of the tensioner arm 32. The lubrication via the oil hole 48 can aid inner components of the self-tensioner 2 to move smoothly.

In some embodiments, a brush bearing 36 can be moved closer in proximity toward the idler assembly 42. That is, the brush bearing 36 closest to the idler assembly 42 can be moved closer toward the idler assembly. Moving the brush bearing 36 closer to the idler assembly 42 can reduce contact pressure upon the pivot brush bearing 38. Moving the brush bearing 36 closer toward the idler assembly 42 can also create a larger oil hole 48 between a first and a second brush bearing 36.

The spring force 68 and the resultant of belt tensioner 66, discussed with respect to FIG. 2C, can act on the pivot brush bearing 38. Arresting movement of the spring 34 in the base member 46 can reduce the resultant (e.g., force) at the pivot of the tensioner arm 32 and the brush bearing 36 (e.g., pivot brush bearing 38). Reducing the force upon the tensioner arm 32 and the brush bearing 36 (e.g., pivot brush bearing 38) can prolong the life of the self-tensioner 2.

In some embodiments, the self-tensioner 2 can include a seal member 54 between the base member 46 and the tensioner arm 32. The seal 54 member can prevent foreign matter from contacting the brush bearing 36 and/or the pivot of the tensioner arm 32. The seal between the base member 46 and the tensioner arm 32 can prevent debris from contacting the inner components of the self-tensioner 2, thereby preventing damage.

Figure 4A:
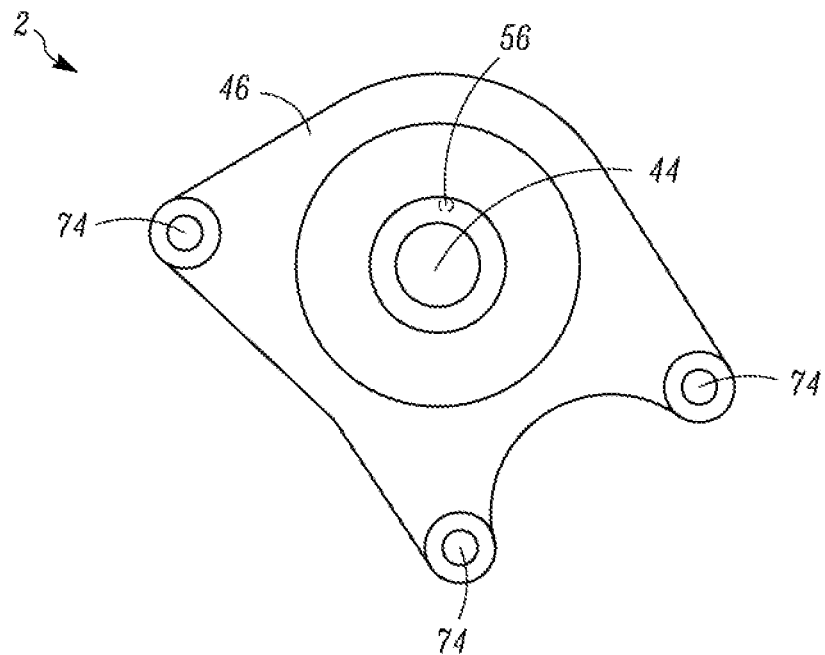
FIGS. 4A-4C illustrate different perspectives of a self-tensioner for a belt drive system in a TRU, according to an embodiment.
Figure 4B:
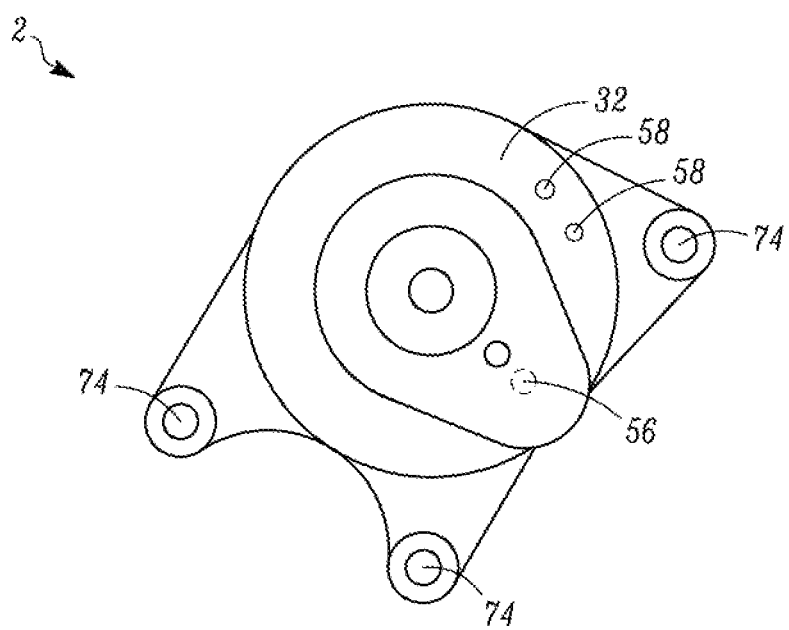
Figure 4C:
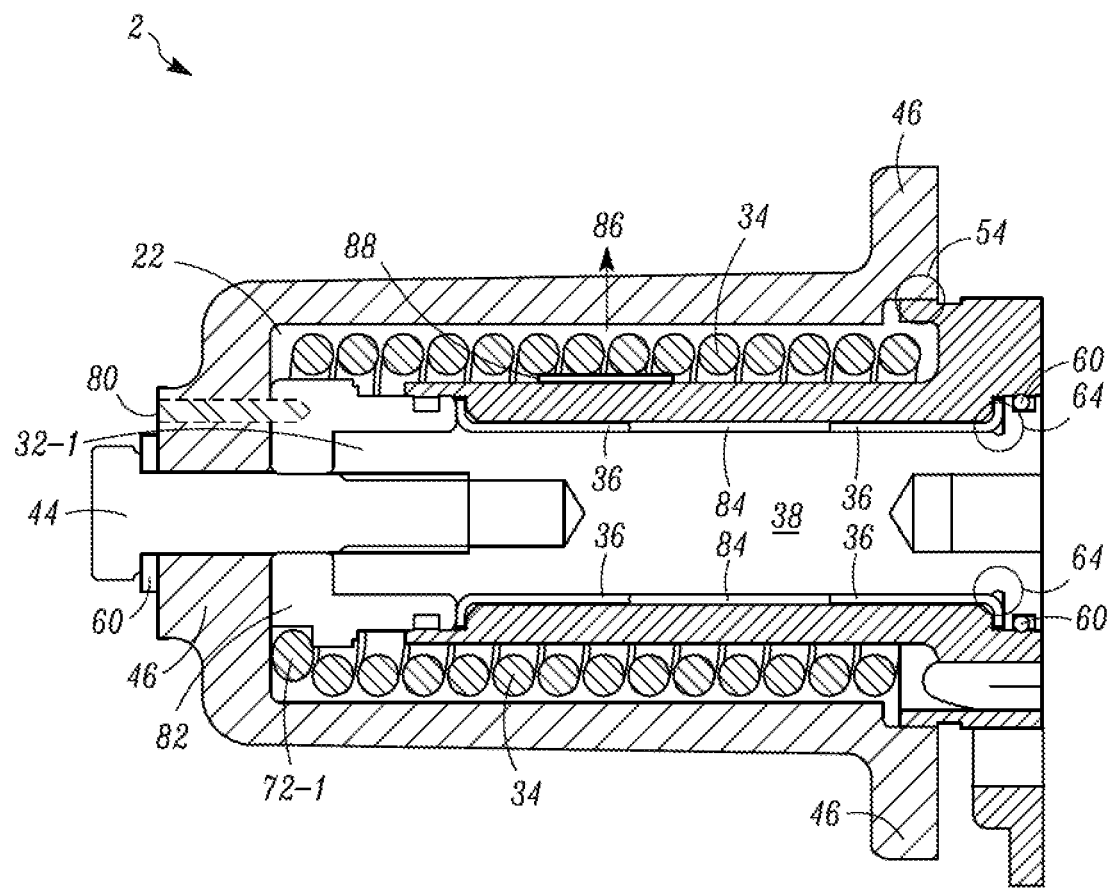

FIGS. 4A-4C illustrate different perspectives of a self-tensioner 2 in a TRU, according to an embodiment. FIG. 4A illustrates a front view of a self-tensioner 2 in a TRU, according to an embodiment. In some embodiments, the self-tensioner 2 includes a base member 46 with a pin hole 56 to receive a pin (e.g., 80 in FIG. 4C). The base member 46 can include a plurality of holes 74 to secure the base member 46 to a component in the TRU. A bolt 44 is threaded through a center of the base member 46 to attach to an tensioner arm (e.g., 32 in FIGS. 3A-3C) for secure attachment of the base member to the tensioner arm.

FIG. 4B illustrates a back view of a self-tensioner 2 in a TRU, according to an embodiment. The self-tensioner 2 illustrated in FIG. 4B includes a base member 46, a plurality of holes 74, and a pin hole 56 as described in FIG. 4A.

In some embodiments, the self-tensioner 2 can include a plurality of secondary pin holes 58. The secondary pin holes 58 can be a plurality of initial positions for which a pin (e.g., 80 in FIG. 4C) is placed to arrest movement of a spring 34, as discussed further herein.

FIG. 4C illustrates a side cut-away view of a self-tensioner 2 in TRU, according to an embodiment. The self-tensioner 2 includes a base member 46 that houses the spring 34 and a portion of the tensioner arm 32. The self-tensioner 2 includes bolt 44 threaded through the center of the base member 46 to connect to the tensioner arm 32. A washer 60 separates a portion of the base member 46 and the bolt 44. In some embodiments, a center of the spring 34, as previously described in relation to FIGS. 3A-3B, slides over a portion of the tensioner arm 32.

In some embodiments, a gap 86 exists between the spring 34 and a first surface 22 of the base member 46, and/or a different gap 88 exists between the spring 34 and the tensioner arm 32. The different gap 88 can prevent contact between the spring 34 and the pivot arm (e.g., 32-1 in FIG. 3C) of the tensioner arm 32 so that the spring 34 does not touch the pivot arm of the tensioner arm 32 in case the spring 34 were to buckle during operation. In some embodiments, the gap 86 between the spring and the first surface 22 of the base member 46 is less than the different gap 88 between the spring 34 and the tensioner arm 32. That is, a larger gap (e.g., different gap 88) can be present between the spring 34 and the tensioner arm 32 as compared to the gap (e.g., gap 86) between the spring 34 and the first surface 22 of the base member 46 to avoid the spring 34 contacting the pivot arm when in motion.

The spring 34 and the tensioner arm 32 are separated by a brush bearing 36. In some embodiments, the brush bearing 36 can be a plurality of flanged brush bearing 36. The plurality of flanged brush bearing 36 can include a first and second brush bearing, where an oil hole and/or a grease-filled cavity 84 separates the first and second brush bearings

36. The base member 46, the spring 34, brush bearing 36, and/or an tensioner arm 32 can form a pivot assembly.

The pivot assembly (e.g., the base member 46, the spring 34, and the brush bearing 36, and/or the tensioner arm 32) includes a seal 54 between the base member 46 and the tensioner arm 32. In some embodiments, the seal 54 can be an O-ring seal. The seal 54 can prevent foreign contaminants from entering the pivot assembly.

In some embodiments, the pivot assembly can include a grinding relief 64 on the pivot pin. The grinding relief 64 can be outside of a load zone to reduce a stress concentration and fatigue failure.

In some embodiments, the base member 46 includes a plurality of initial pin 80 positions. The initial pin 80 position can, in some embodiments, be selected. Each pin 80 position among the plurality of initial pin 80 positions can provide a different amount of tension for the spring 34 when a pin 80 is locked into place. The initial pin 80 position determines an amount of tension for the spring 35 and determines a spring force (e.g., 68) exerted by the spring 34.

Movement of the spring 34 is arrested via the base member and a pin 80. In some embodiments, movement of the spring 34 is arrested by utilizing a pin locking mechanism associated with the base member 46. The pin locking mechanism includes the pin 80 (e.g., a lock pin) inserted through a pin hole (e.g., 56 in FIGS. 4A-4B) on the outside of the base member 46 and through a hole in a spring base 82 within the base member 46 to preclude movement of the spring 34 within the base member 46. The pin locking mechanism locks the leg (e.g., 72) of the spring 34 into a set position. When the spring 34 is locked, the tension of the spring 34 is set, which determines a force of the spring 34.

As previously discussed with respect to FIG. 3B, locking the spring 34 into position determines the spring force (e.g., 68 FIG. 3B) and combines with the resultant of belt tension (e.g., 66 in FIG. 3B) to act on the pivot of the tensioner arm 32. Locking the spring 34 in place cause the spring force 68 and the resultant of the belt tension 66 to be opposite forces, the opposite forces act to decrease the resultant at the pivot arm of the tensioner arm (e.g., 38 in FIG. 3B). Reducing the resultant at the pivot decreases the force on the pivot arm of the tensioner arm 32, which decreases contact pressure and wear on the tensioner arm 32. Preventing debris from entering the self-tensioner 2 and decreasing the contact pressure and/or wear on the tensioner arm 32 can increase the life-span of the self-tensioner 2.

Figure 5:
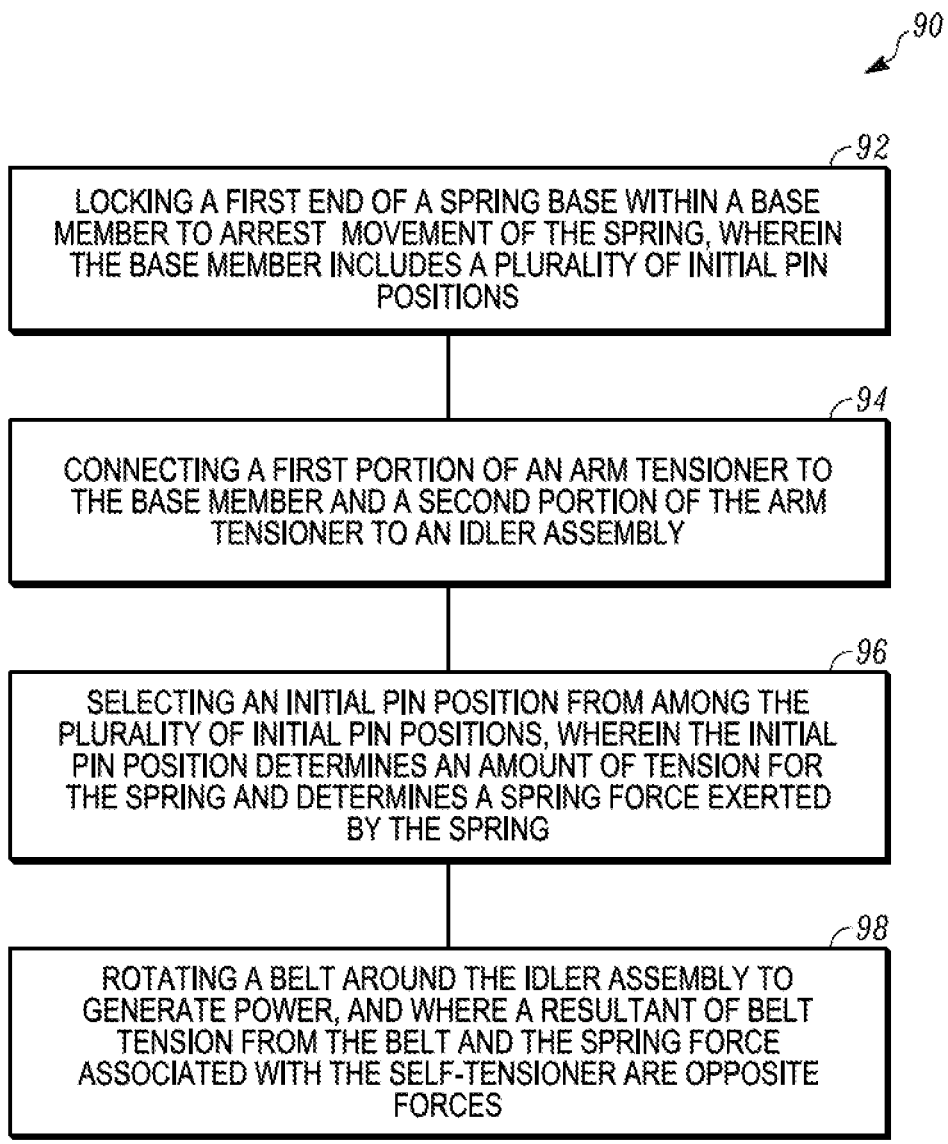
FIG. 5 illustrates a flow diagram for a method of providing tension using a self-tensioner, according to an embodiment.

FIG. 5 illustrates a flow diagram for a method 90 of providing tension using a self-tensioner, according to an embodiment.

At 92, the method 90 includes locking a first end of a spring via a spring base within a base member to arrest movement of the spring, where the base member includes a plurality of initial pin positions. In some embodiments, cast bosses, as previously described herein, may also be used to lock the spring in the base member. The method 90 then proceeds to 94.

At 94, the method 90 includes connecting a first portion of an tensioner arm to the base member and a second portion of the tensioner arm to an idler assembly. The idler assembly can rotate about an axis via the belt on the tensioner arm in the belt driven system. The belt driven system provides power to the components of the systems (e.g., pulleys, alternators, fans, etc.). The method 90 then proceeds to 96.

At 96, the method 90 includes selecting an initial pin position from among the plurality of initial pin positions, wherein the initial pin position determines an amount of tension for the spring and determines a spring force exerted by the spring. The spring force can act in coordination with the belt tension, to provide proper tension to the belt in the system. The method 90 then proceeds to 98.

At 98, the method 90 includes rotating a belt around the idler assembly to generate power, and where a resultant of belt tension from the belt and the spring force associated with the self-tensioner are opposite forces. The opposite forces can reduce/decrease the resultant force at the pivot arm of the tensioner arm, which can decrease contact pressure and wear on the tensioner arm 32. Decreasing the contact pressure and/or wear on the tensioner arm 32 can increase the life-span of the self-tensioner 2, thereby providing reliable tension in the belt-drive system.

Figure 6A:
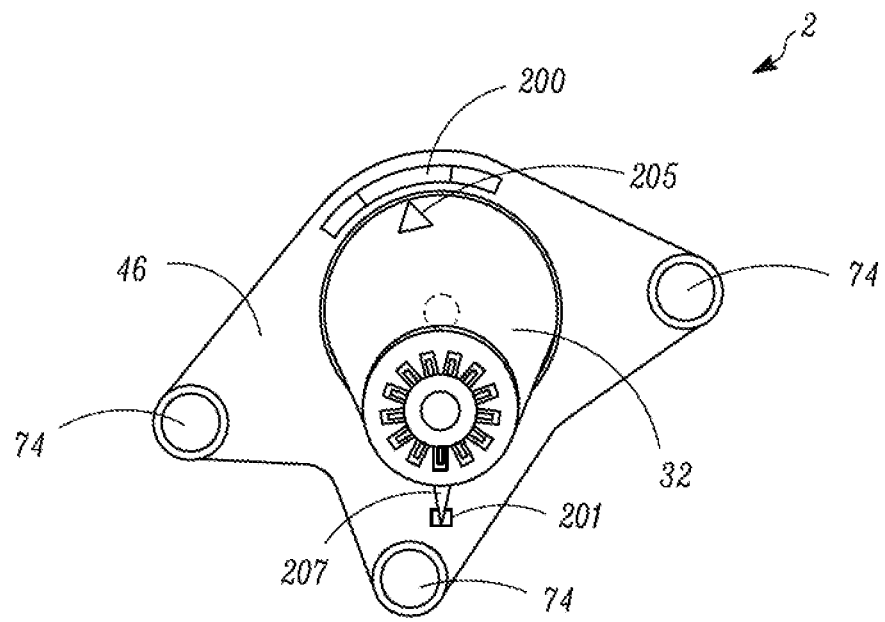
FIGS. 6A-6D illustrate different perspectives of the self-tensioner for a belt drive system according to an embodiment.
Figure 6B:
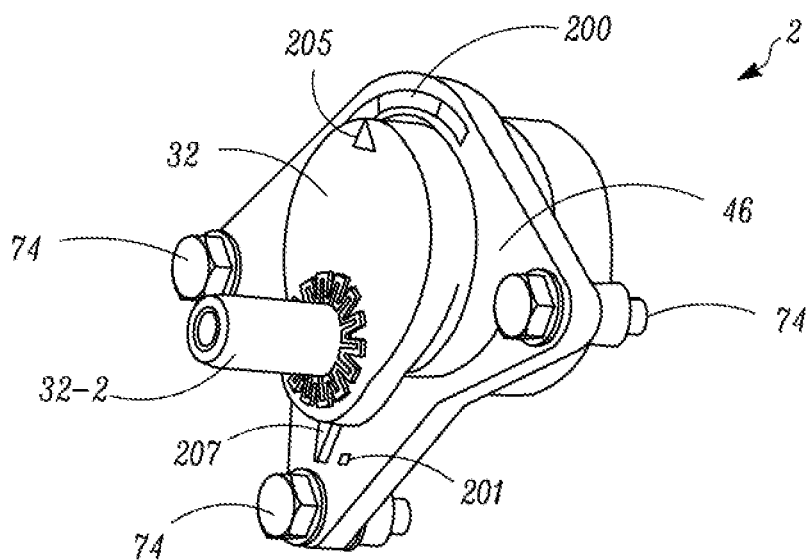
Figure 6C:
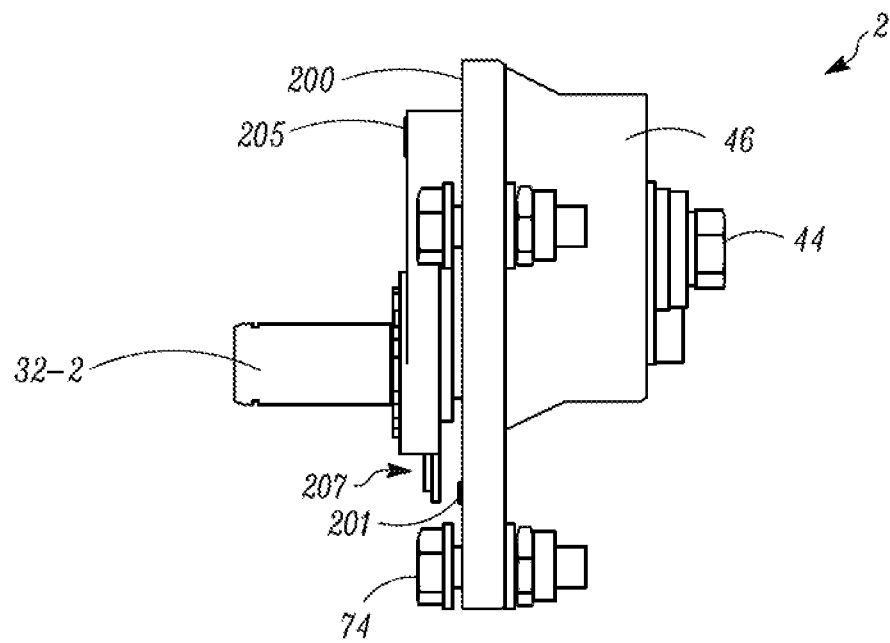
Figure 6D:
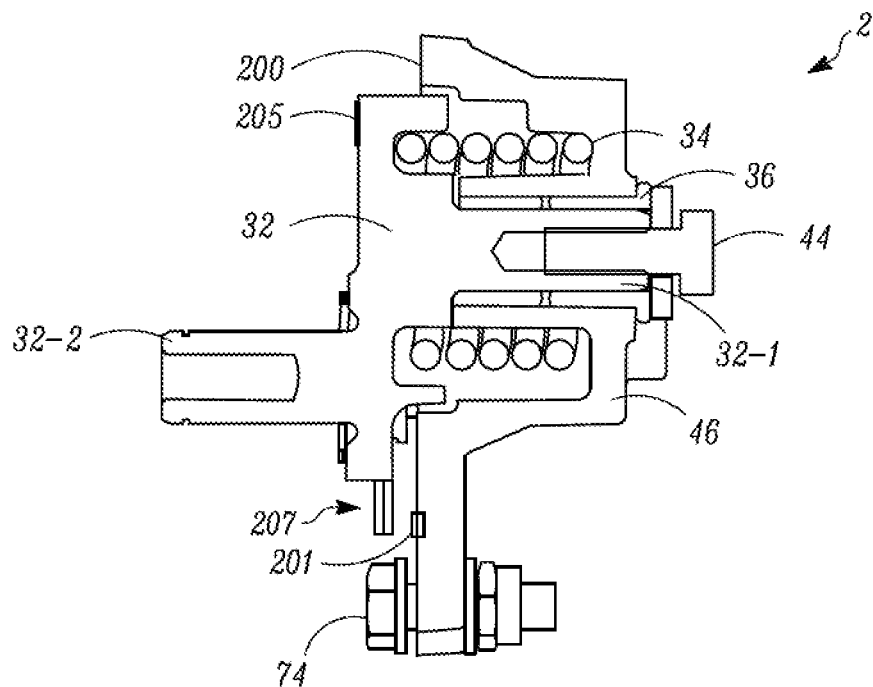

FIGS. 6A-6D illustrate different perspectives of a self-tensioner 2 for a belt drive system (e.g., the belt drive system 110 shown in FIG. 2), according to an embodiment. FIG. 6A illustrates a back view of the self-tensioner 2. FIG. 6B illustrates an off-set side view of the self-tensioner 2. FIG. 6C illustrates a side view of the self-tensioner 2. FIG. 6D illustrates a side cut-away view of the self-tensioner 2. FIGS. 6A-6D are discussed collectively as follows.

As illustrated in FIGS. 6A-6D, the self-tensioner 2 can include the similar or identical features as self-tensioners previously described herein. For simplicity of the specification, features previously described herein will not be described in detail. The self-tensioner 2 of FIGS. 6A-6D can further include a sensor 201, a magnet 207, and an indicator 200, as discussed further herein.

The self-tensioner 2 of FIGS. 6A-6D can house a sensor 201 on the base member 46. The sensor 201 can be a surface mount sensor 201 on the self-tensioner 2 in a belt drive system. The sensor 201 can detect tensioner arm 32 movements (e.g., the tensioner arm 32 shown in FIG. 3C). The detected movement of the tensioner arm 32 of the self-tensioner 2 by the sensor 201 can be received as a signal. The signal is the movement of a tensioner arm 32 in relation to the self-tensioner 2. The tensioner arm 32 can receive force from a belt, and the force from the belt can cause the tensioner arm 32 to move, as previously discussed herein. The belt may be a loop that can be formed of a flexible or stiff material, as previously described herein. The signals (e.g., movements of the tensioner arm) can be interpreted into estimated belt lifespan predictions, as described further herein.

The sensor 201, in some embodiments, can be a magnetoresistance sensor. For example, the sensor 201 can be an anisotropic magnetoresistance (AMR) sensor. The AMR sensor may have a property of a material that changes the value of its electrical resistance when an external magnetic field is applied to it. The sensor 201, being a magnetoresistance sensor, can have an associated material that changes a value of its electrical resistance when an external magnetic field is applied. The magnetic field can change resistance by orders of magnitude. In an embodiment, the sensor 201 can be powered by a battery connected to the transport refrigeration unit (TRU).

The self-tensioner 2 includes a magnet 207 that is connected to the tensioner arm 32. The magnet 207 can move in response to movement of the tensioner arm 32. The magnet 207 can move over the sensor 201.

The movement of the magnet 207 can result in signal changes. The magnet 207 can provide a magnetic field to the sensor 201, which can change the value of the electrical resistance. The magnet 207 is a component that can provide a magnetic field. In an embodiment, the magnet 207 can be a permanent magnet, such as ceramic or ferrite. The magnet 207 can be within a particular distance of the sensor 201, such that the magnet 207 can provide a magnetic field to the sensor 201.

The signal from the self-tensioner 2 and the magnetic field from the magnet 207 can generate a voltage value. The voltage value can be converted by a controller into a tension value associated with the belt in the belt driven system. The voltage value can be converted into a tension value via a signal conversion into an output voltage with respect to a direction of magnetic flux from the magnet 207 that passes over the sensor 201. The movement of the magnet 207 can include a particular angle and/or degree (theta), as discussed in more detail below with respect to FIGS. 8, 9, and 10.

In general terms, the sensor 201 is connected to the self-tensioner 2 in a belt drive system. The sensor 201 can receive a signal from a tensioner arm of the self-tensioner 2 and the magnet 207 can provide a magnetic field to the sensor 201. The magnet 207 can alter the signal, and a voltage value can be generated. In other words, based on the detected signal from the self-tensioner 2 and the magnetic field, an output voltage can be generated with respect to the direction of the magnetic flux from the magnet 207 passing over a surface of the sensor 201. The voltage value can be converted, by a controller, into a tension value. The tension value corresponds to a belt tension in the belt driven system, as discussed further herein.

The self-tensioner 2 includes a probe 205 and an indicator 200. In this embodiment, the probe 205 is located on the tensioner arm 32 and the indicator 200 is located on the base member 46. The probe 205 can move in response to the tensioner arm 32. The probe 205 can move radially, such as in a left or right motion relative to the sensor 201. The indicator 200 can be stationary upon the base member 46. The indicator 200 can include segmentation with colors denoting the segments. The segmentations can correspond to a belt tension threshold. The belt tension threshold can include a minimum threshold tension value and a maximum threshold tension value at which a belt may properly function.

In an embodiment, the movement of the probe 205 relative to the indicator 200 can indicate a tension value. A position of the probe 205 relative to the indicator 200 can provide a visual indication of the tension value to a user. For example, a user (e.g., a person, operator, etc.) can view the self-tensioner 2 and look to the position of the probe 205 relative to the indicator 200 for an estimation of the belt tension. As illustrated in FIG. 6A, for example, the indicator 200 includes segmentations of red and green coloration. The probe 205 corresponds to the green segment of the indicator 200, which can visually indicate to a user that the tension value is within the belt tension threshold. A tension value within the belt tension threshold can correlate to proper belt tension in the belt driven system. In an embodiment, the belt tension threshold can correspond to a belt lifespan, as discussed further with respect to FIG. 11.

Figure 7A:
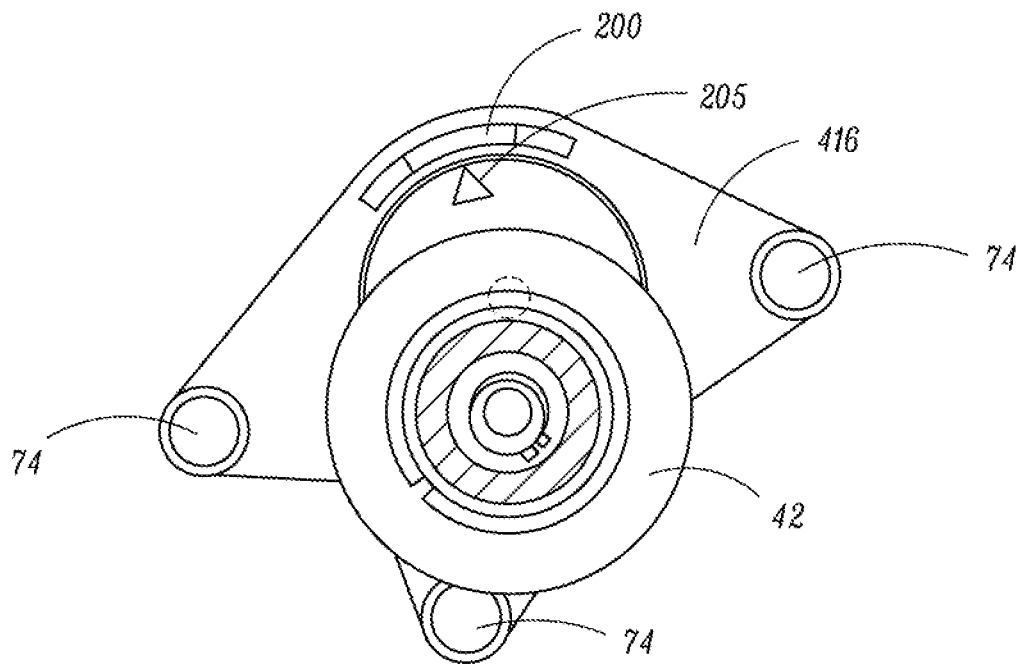
FIG. 7A-7D illustrate different perspectives of the self-tensioner corresponding to FIGS. 6A-6D with an idler assembly for a belt drive system according to an embodiment.
Figure 7B:
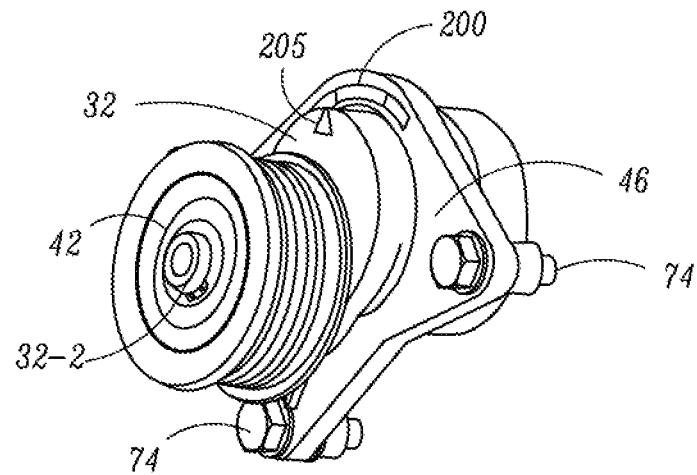
Figure 7C:
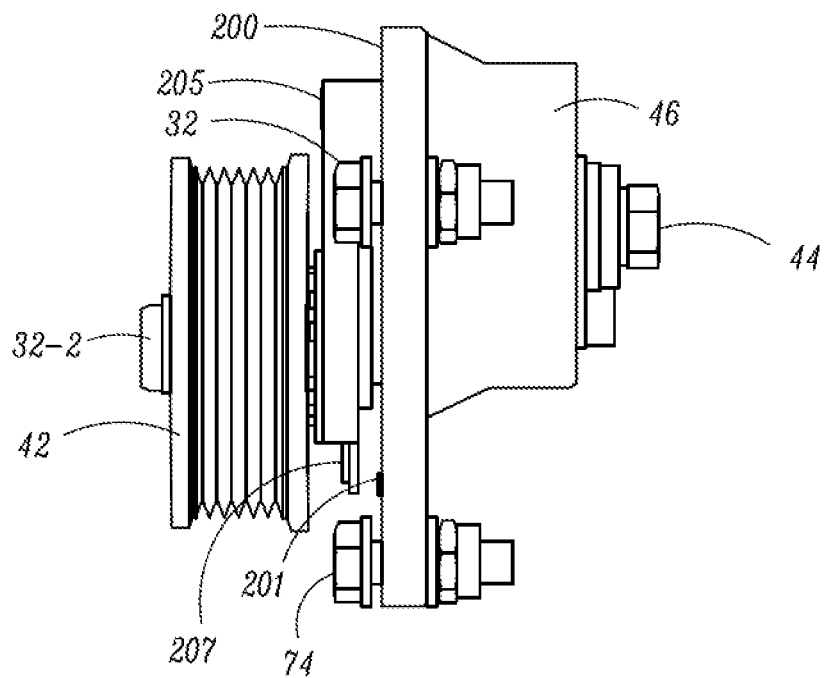
Figure 7D:
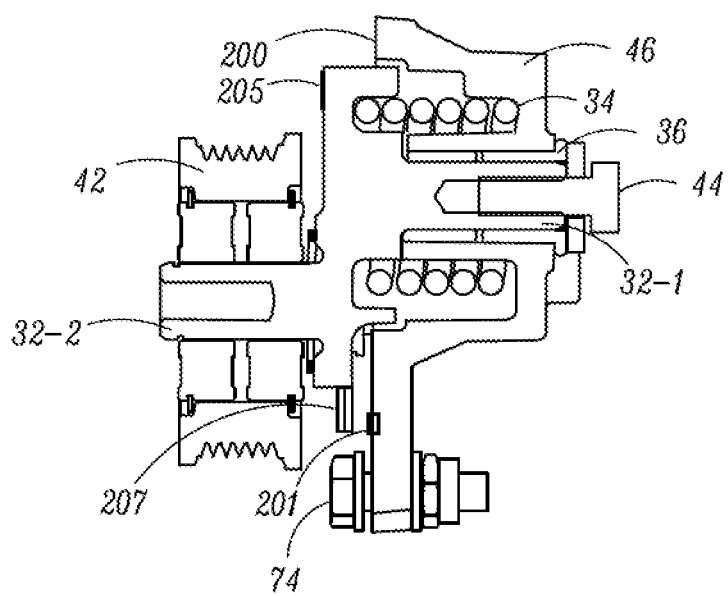

FIGS. 7A-7D illustrate different views of a self-tensioner 2, with an idler assembly 42 for a belt drive system in a TRU, according to an embodiment. FIG. 7A illustrates a back view of the self-tensioner 2 with the idler assembly 42. FIG. 7B illustrates an off-set side view of the self-tensioner 2 with the idler assembly 42. FIG. 7C illustrates a side view of the self-tensioner 2 with the idler assembly 42. FIG. 7D illustrates a side cut-away view of the self-tensioner 2 with the idler assembly 42. The Figures of 7A-7D are discussed collectively as follows.

The self-tensioner 2 of FIGS. 7A-7D illustrate the self-tensioner 2 of FIGS. 6A-6D with the idler assembly 42, as previously disclosed herein. A belt can be associated with the idler assembly 42, which rests upon the tensioner arm 32. The belt can exert a force onto the idler assembly 42, which is transferred to the tensioner arm 32. The tension value of the belt can impact the functioning of the self-tensioner 2 and the belt lifespan. An improper tension value can cause damage to the self-tensioner (e.g., more wear) and/or decreased belt lifespan. In an embodiment, a corresponding belt lifespan can be correlated to a tension value, and the tension value can be directly proportional to the belt lifespan, as discussed further herein.

Figure 8:
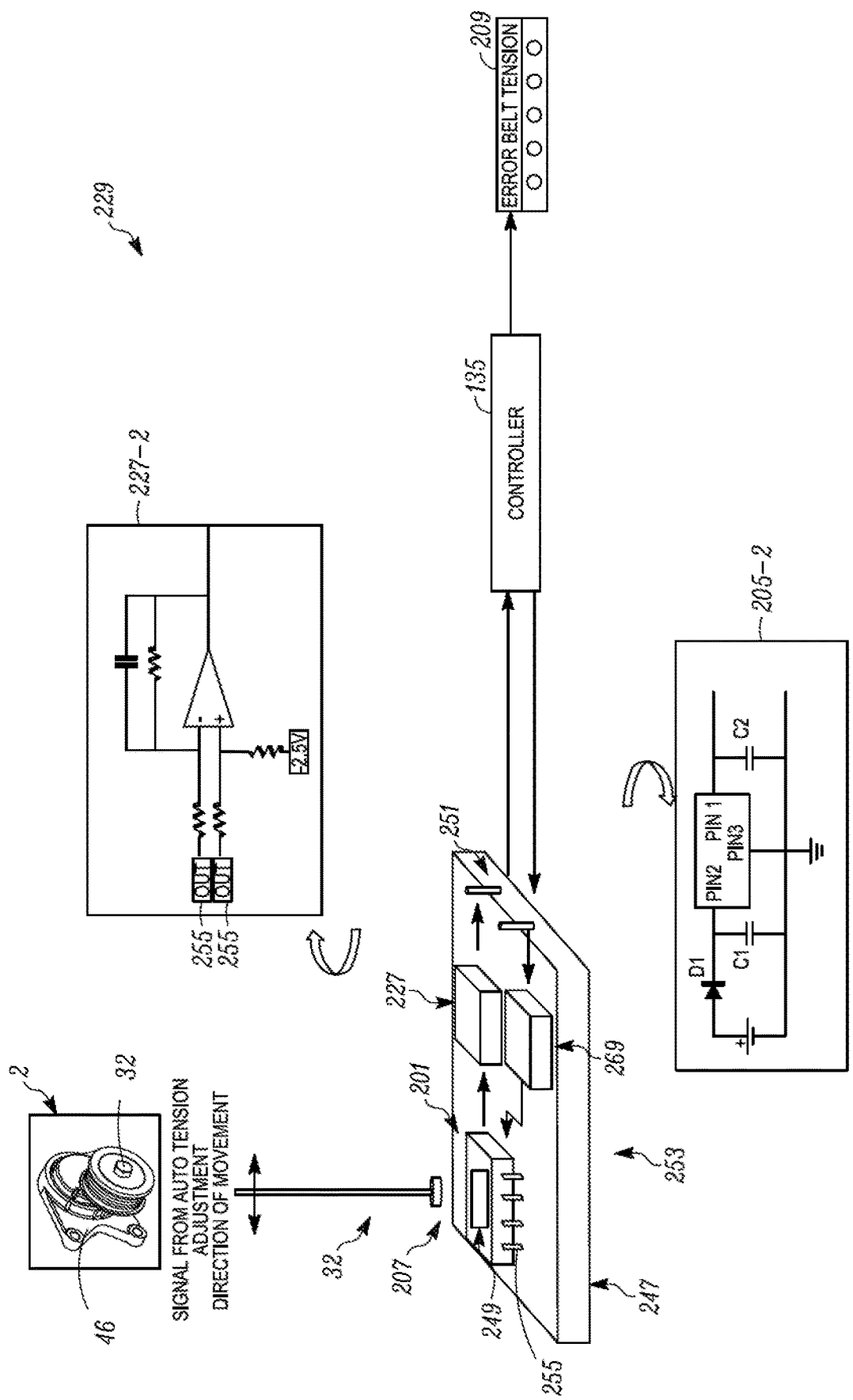
FIG. 8 illustrates an environment of belt tension monitoring, according to an embodiment.
Figure 9:
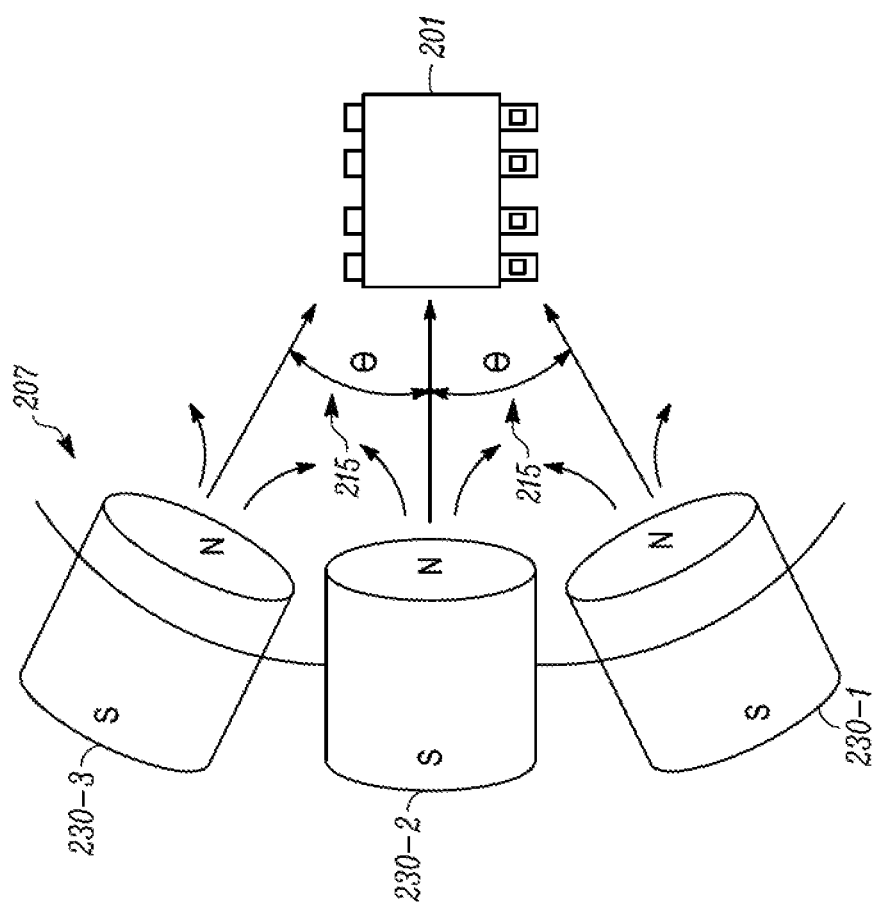
FIG. 9 illustrates a translation from a self-tensioner to sensor to determine a voltage value, according to an embodiment.
Figure 10:
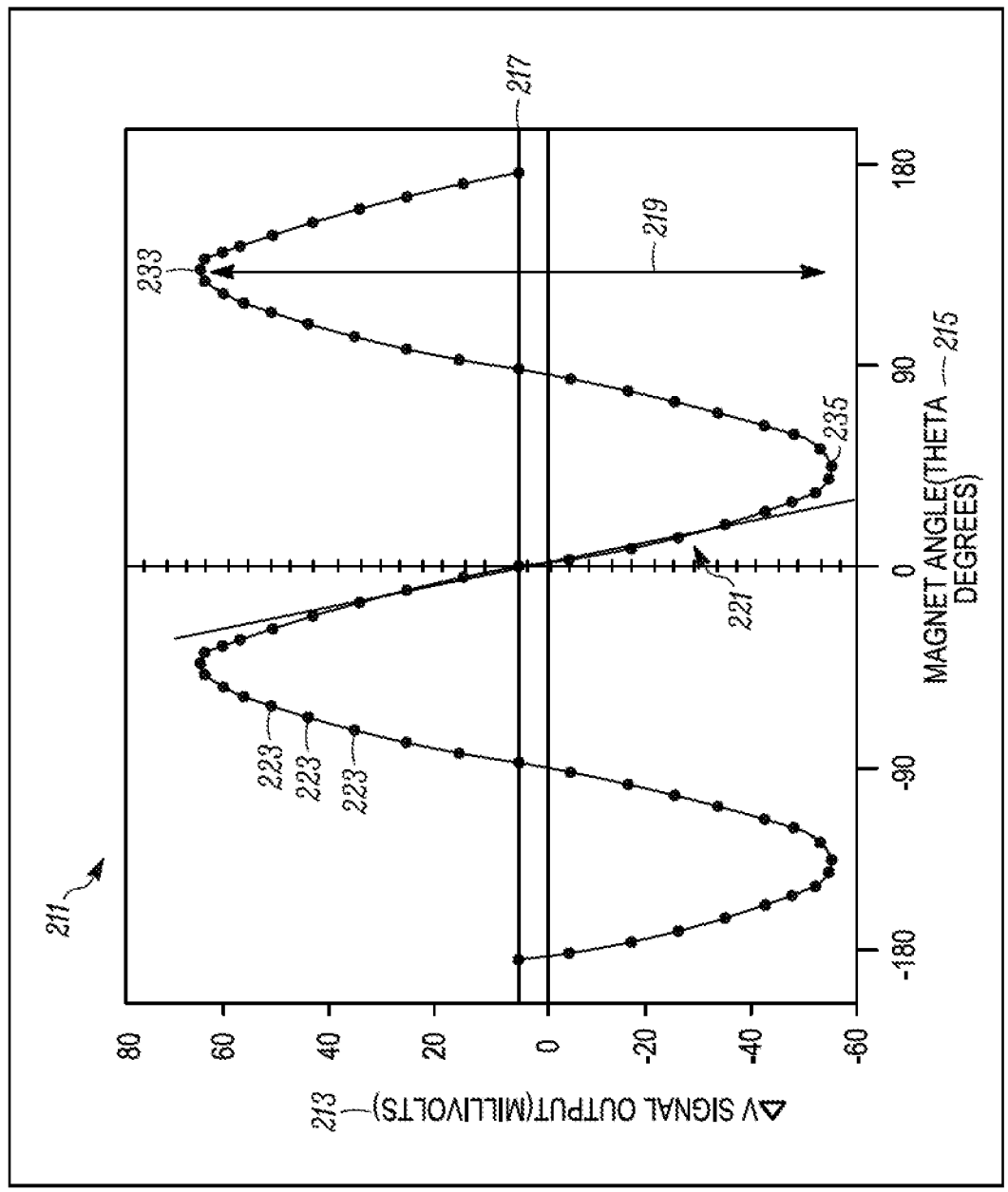
FIG. 10 illustrates the graphical representation of an output voltage in relation to an angle of a magnet position in response to an applied magnetic field, according to an embodiment.

FIGS. 8, 9, and 10 are discussed individually and collectively herein. FIG. 8 illustrates an environment 229 of belt tension monitoring. FIG. 9 illustrates a translation from the self-tensioner 2 to a sensor 201 to determine a voltage value. FIG. 10 illustrates a graphical representation of an output signal in relation to a direction of an applied magnetic field, according to an embodiment.

As generally illustrated in FIG. 8, the environment 229 includes the self-tensioner 2, a controller 135, and a human-machine interface (HMI) 209. The HMI 209 can be a part of the integrated control unit (e.g., 140 described in FIG. 1).

The self-tensioner 2 includes the tensioner arm 32 that provides an amount of tension to a belt in the belt drive system. The tensioner arm 32 may move over time and/or in response to a force from a belt in the belt drive system, as previously discussed herein.

The sensor 201 can be housed on a base member 46 of the self-tensioner 2. The sensor 201 can detect the movement of the tensioner arm 32. The detected movement of the tensioner arm 32 can be received as a signal. The sensor 201 receives the signal from the tensioner arm 32 of the self-tensioner 2.

The self-tensioner 2 includes a circuit board 253, which includes a plurality of components. The sensor 201 is a component among a plurality of components on a printed circuit board (PCB) 247 of the circuit board 253. The plurality of components associated with the circuit board 253 includes the sensor 201, an amplifier 227, a voltage regulator 269, and terminals 251. The plurality of components on the PCB 247 can be used to convert a signal from the tensioner arm 32 of the self-tensioner 2 to a voltage (V), as described further herein.

The sensor 201 can detect the movement of the tensioner arm 32 over a surface 249 of the sensor 201. The movement of the tensioner arm 32 can be received by the sensor 201 as a signal. In an embodiment, the sensor 201 can use anisotropic magneto-resistive (AMR) technology, which can be more precise due to its ability to withstand large variations in magnet to sensor gaps and/or insensitivity to noise and vibrations. For example, the sensor 201 can be in the form of a Wheatstone bridge, where a resistance (R) of the bridge (e.g., legs) is the same. The resistance (R) of each of the bridge legs of the sensor 201 can be a uniform resistance. By way of further example, the sensor 201 can receive power from a vehicle battery, and the sensor 201 bridge power supply (Vb) can cause a current to flow through the bridge elements.

The sensor 201 can detect angular or rotary displacement in a magnetic saturating field. For example, the sensor 201 can include position sensing, rotary speed and angle θ detection, and/or non-contact prevision location measurement sensor systems.

A magnet 207 can be used to magnetize the sensor 201. The magnet 207 can be connected to the tensioner arm 32, and can move in response to movement of the tensioner arm 32. The magnet 207 can pass over the surface of the sensor

201. The magnet 207, in response to the sensor 201, can measure the magnetic field direction. In an embodiment, the sensor 201 (e.g., a magneto-resistive sensor, such as a Wheatstone bridge sensor) when magnetized can measure a magnetic field direction.

The materials associated with the sensor 201 (e.g., Wheatstone bridge) can change resistance when the magnetic field from the magnet 207 is applied. For example, the bridge elements of the sensor 201 can change resistance (e.g., from a uniform resistance to different resistances) when the magnet 207 applies a magnetic field across the silicon die that includes thin films of magneto-resistive ferrous material forming the resistive elements on the printed circuit board (PCB) 247. The magneto resistance can be a function of $\cos 2\theta$ where $\theta$ is the angle between the applied magnetic field (M) and the current flow direction of the thin film.

In an embodiment, when the applied magnetic field from the magnet 207 exceeds a particular magnetization (e.g., greater than 50 Oerstad (Oe)), the magnetization of the thin films can align in an identical direction as the applied magnetic field, which creates a saturation mode. The thin films align in the same direction as the applied magnetic field. In the saturation mode, $\theta$ is the angle between the direction of the applied magnetic field and the bridge current flow. In an embodiment, while in saturation mode, the sensor 201 may only be sensitive to the direction of the applied magnetic field and not amplitude.

As discussed further herein, a position of the magnet 207 can include an angle (theta) with respect to the sensor 201. The angle formed by the magnet 207 and the signal/voltage value can be used to determine a tension value of the belt in the belt drive system. The tension value can be correlated to time, which can indicate a belt lifespan (e.g., time remaining for the belt operating at the tension value). A position of the magnet 207 can be used to determine a tension value, as described further herein with respect to FIGS. 9 and 10.

The sensor 201 can have an output of voltage that is $V=-Vb*S \sin(2\theta)$, where Vb is the bridge power supply, and S is a sensor constant that is determined by the materials associated with the sensor 201. For example, in an embodiment, the sensor constant (S) can be 12 mV/V.

In an embodiment, the sensor 201 can include an AMR bridge for a +/−45 degree range of position sensing. The differential output voltage having the following equation: $\Delta V=-Vs\, S \sin(2\theta)$, where Vs is the supply voltage, S is the sensor material constant (e.g., 12 mV/V), and $\theta$ is the reference to magnetic field angle in degrees.

To interface with output pins (OUT+, OUT−) 255 of the sensor 201, an instrumentation amplifier 227 with an amplifier circuit diagram 227-2 can be included in the environment 229. The instrumentation amplifier 227 can derive the different output voltage of the output pins 255 (e.g., OUT+ minus OUT−) of the sensor 201 and provide additional signal amplification as desired. As illustrated in the amplifier circuit diagram 227-2, in an embodiment, 10 kilo-Ohm input resistors can present high impedance from the sensor 201 (e.g., a Wheatstone bridge sensor), and a 249 kilo-Ohm resistor can set the instrumentation amplifier 227 gain and bias at approximately 25V/V and 2.5 volts, respectively. Further, as illustrated in the amplifier circuit diagram 227-2 of FIG. 8, a 0.01 microfarad capacitor can be placed in the feedback loop to decrease system bandwidth and/or to decrease noise outside of the sensor 201 and amplifier 227.

Excessive noise and vibration outside the sensor 201 and/or the amplifier 227 can affect a meaningful reading. Noise and/or vibrational interference may be decreased by using the AMR sensor and/or measuring and converting the signal prior to unit startup. The tension value can be determined before the transport refrigeration unit (TRU) is in operation, which may decrease supplementary noise and vibration associated with the unit. Additionally, or alternatively, in some embodiments, a microfarad capacitor may be placed in the feedback loop of the amplifier circuit diagram 227-2. The microfarad capacitor can lower system bandwidth and exclude noise outside the sensor 201 and amplifier 227. Obtaining the tension value prior to TRU operation and/or reducing noise outside the sensor 201 and amplifier 227 can increase the measurement accuracy.

As further illustrated by FIG. 8, the sensor 201 can provide an output voltage that is based on a tension value fed to amplifier 227. The amplifier 227 can be an analog-to-digital converter (ADC) stage stand-alone with an associated circuit diagram 205-2, or within a microprocessor integrated circuit. The amplifier 227 can transfer the output voltage to controller 135 via terminal 251. The controller 135 can store and/or correlate the output voltage value to a historic tension value. For example, the controller 135 can convert the output voltage into a tension value and/or correlate the tension value to a historic tension value.

In an embodiment, the controller 135 can provide power to the sensor 201 through the voltage regulator 269. The voltage regulator 269 can convert the voltage power of the controller 135 such that it is compatible with the sensor 201. For example, the controller 135 may provide 12 V, while the sensor 201 can use 5 V. The voltage regulator 269 can convert the 12 V from the controller 135 into 5 V for the sensor 201.

The controller 135 can be and/or associated with an internal and/or external storage device that can store data. The controller 135 can log data received from the sensor 201. For example, the external storage device can store historic tension values and corresponding belt lifespan data with respect to time. The historic tension values are premeasured tension values. That is, the controller 135 connected to the self-tensioner 2 can store the tension value (e.g., based on the output voltage and angle of the magnet) among historic tension values and corresponding belt lifespan in a memory for future reference and/or comparison. The tension value can be compared and matched to a particular premeasured tension value among the historic tension values, which can determine the belt tension condition of the belt in the belt drive system. The belt tension condition can be an error belt tension condition or normal belt tension condition, as discussed further herein.

The controller 135 is in communication with a human-machine interface (HMI) 209. The HMI 209 can include an interface that is configured to receive and connect with the controller 135 and/or an external storage device. The HMI 209 can provide a notification of a belt tension error. The interface of the HMI 209 can be accessible to a user so that the user can receive a notification from the controller 135 with respect to a belt tension condition and/or an alarm, as described further herein.

The HMI 209 can include a communication protocol that communicates with devices other than a controller 135 (e.g., such as the TRS controller 135 shown in FIG. 1), such as an external database that is not included in a TRS. In some examples, the communication protocol can be a wireless communication protocol, such as a WiFi protocol. In some examples, the controller 135 can be configured to transmit information to the HMI 209 and/or the external storage device, such as a database, periodically.

As illustrated in FIG. 9, the translation includes the sensor 201 and the magnet 207, as previously discussed with respect to FIG. 8. The translation of FIG. 9 further includes the positions 203 of the magnet 207 with respect to the sensor 201.

The orientation of the sensor 201 is stationary. The position 203 of the magnet 207 can translate to 45 degrees and remain within a linear slope of the output voltage for position sensing. For instance, the position 203 of the magnet 207 can include a first position 203-1, second position 203-2, and a third position 203-3. The position 203 of the magnet 207 can indicate the various positions of vector travels. For example, the first position 203-1 and the third position 203-3 can indicate an end of the vector travel since the position 203 of the magnet 207 has moved as far from the magnetic field as possible. Alternatively, the second position 203-2 indicates a center of travel as the position 203 of the magnet 207 may be relatively within the center of the magnetic field.

The position 203 of the magnet 207 relative to the center of the magnetic field can form an angle ($\theta$) 215 that is measured in degrees. The angle ($\theta$) 215 derived from the position 203 of the magnet 207 can be correlated to the output voltage, as described further with respect to FIG. 10. In an embodiment, optimal magnet angle ($\theta$) values can be located within the second position 203-2.

FIG. 10 illustrates the graphical representation 211 of an output voltage 213 in relation to an angle of a magnet position in response to an applied magnetic field, according to an embodiment. The graphical representation 211 includes the angle 215 ($\theta$, theta) along the X-axis, while a change in the output voltage (mV) 213 is provided along the Y-Axis.

In an embodiment, the supply voltage (Vs) can be 5 volts (e.g., Vs=+5 dc), which can provide approximately 120 mV swing (60 millivolts) on a 2.5 volt bias voltage. The sensor (e.g., 201 as shown in FIG. 7) can provide a differential voltage output with a bias voltage from the 5 volt supply voltage. For example, the 2.5 bias volts can be present due to the Wheatstone bridge sensor that provides differential voltage output with a bias voltage from the 5 volt supply voltage. An offset 217 can be parallel to the angle ($\theta$) 215 of the magnet (e.g., 207 in FIGS. 6A-6D, 8 and 9) and perpendicular to the output voltage 213 to accommodate the differential voltage output.

The magnet 207 can apply a magnetic field to the sensor 201, as discussed with respect to FIGS. 8 and 9. The resulting magnet angle (O) 215 can be correlated to an output voltage 213. A plurality of points 223 can be plotted in the graphical representation 211, which represent the angle ($\theta$) 215 of the magnet 207 correlated to the output voltage 213. A linear range 221 can be calculated from the plurality of points 223 via the slope. The linear range 221 can indicate the minimum and maximum output voltage 213 with respect to the magnet angle ($\theta$) 215. The linear range 221 correlates a particular output voltage 213 with a particular magnet angle ($\theta$) 215. The linear slope (not shown) can aid in the selection of the sensor 201. Selection of the sensor 201 can be based on an operating limit that is a maximum radial movement. The magnet (e.g., 207 in FIG. 6D) may fall in the linear slope range of the sensor output.

Additionally, the graphical representation 211 includes a peak to peak value 219. The sensor can include one AMR bridge that has approximately a +/−45 degree range of position sensing angles with respect to the magnet. The peak to peak value 219 can be determined from the lowest point among the plurality of points 223 to the highest point among the plurality of points 223 on the graphical representation 211. The peak to peak 219 can indicate the minimum output voltage 235 and the maximum output voltage 233 within the range of position sensing angles (e.g., +/−45 degrees) of the magnet 207.

FIGS. 8, 9, and 10 collectively describe the sensor 201 detecting an output voltage and using the output voltage in relation to an angle of the magnet 207 to determine a tension value.

As previously described herein, the controller (e.g., 135 shown in FIG. 8) can receive the output voltage from the sensor 201. The output voltage can be converted into a tension value, which represents the tension of the belt in the belt drive system.

In an embodiment, the controller 135 can compare the tension value and a threshold to determine a belt tension condition of a belt drive system. A belt tension condition can be based on a threshold. The threshold can include a minimum threshold tension value and a maximum threshold tension value. A set value representing the most efficient tension value and longest belt lifespan can be within the threshold. The threshold and the set value can be derived from a plurality of premeasured tension values (e.g., historic tension values).

A belt tension condition can be a normal belt tension condition (e.g., non-error belt tension condition) or an error belt tension condition. A tension value within the threshold is a tension value that is greater than the minimum threshold tension value and less than the maximum threshold tension value. A tension value within the threshold can correlate to a normal belt tension condition.

When the tension value is within the threshold (e.g., not outside the threshold), the controller 135 can transmit to the HMI 209 a normal belt tension condition, indicating the belt has proper belt tension. When the tension value is within the threshold (e.g., between the minimum threshold tension value and maximum threshold tension value), the controller 135, in response, can activate unit startup and the sensor 201 can be deactivated.

A tension value outside of the threshold is a tension value less than the minimum threshold tension value or greater than the maximum threshold tension value. When the tension value exceeds the maximum threshold tension value, the tension value can correlate to an error belt tension condition. For example, a tension value that exceeds the maximum threshold tension value indicates that the belt tension may be too high and the belt drive system can be operating in an error belt tension condition. The error belt tension condition may indicate that the belt may slip or squeal, which may cause damage to the belt drive system.

The error belt tension condition can indicate potential belt failure of the belt drive system. When the tension value is outside the threshold, the controller 135 can transmit to the HMI 209 the error belt tension condition, indicating the belt does not have proper belt tension. The HMI 209 can trigger an alarm in response to the error belt tension condition and/or when the tension value is outside the threshold. The alarm can be a notification of an improper belt tension (e.g., tension value too high or low) and potential damage to the belt driven system.

In an embodiment, a corresponding belt lifespan can be correlated to each premeasured tension value among the plurality of historic tension values. The tension value can be directly proportional to the belt lifespan, as discussed further herein with respect to FIG. 11.

Figure 11:
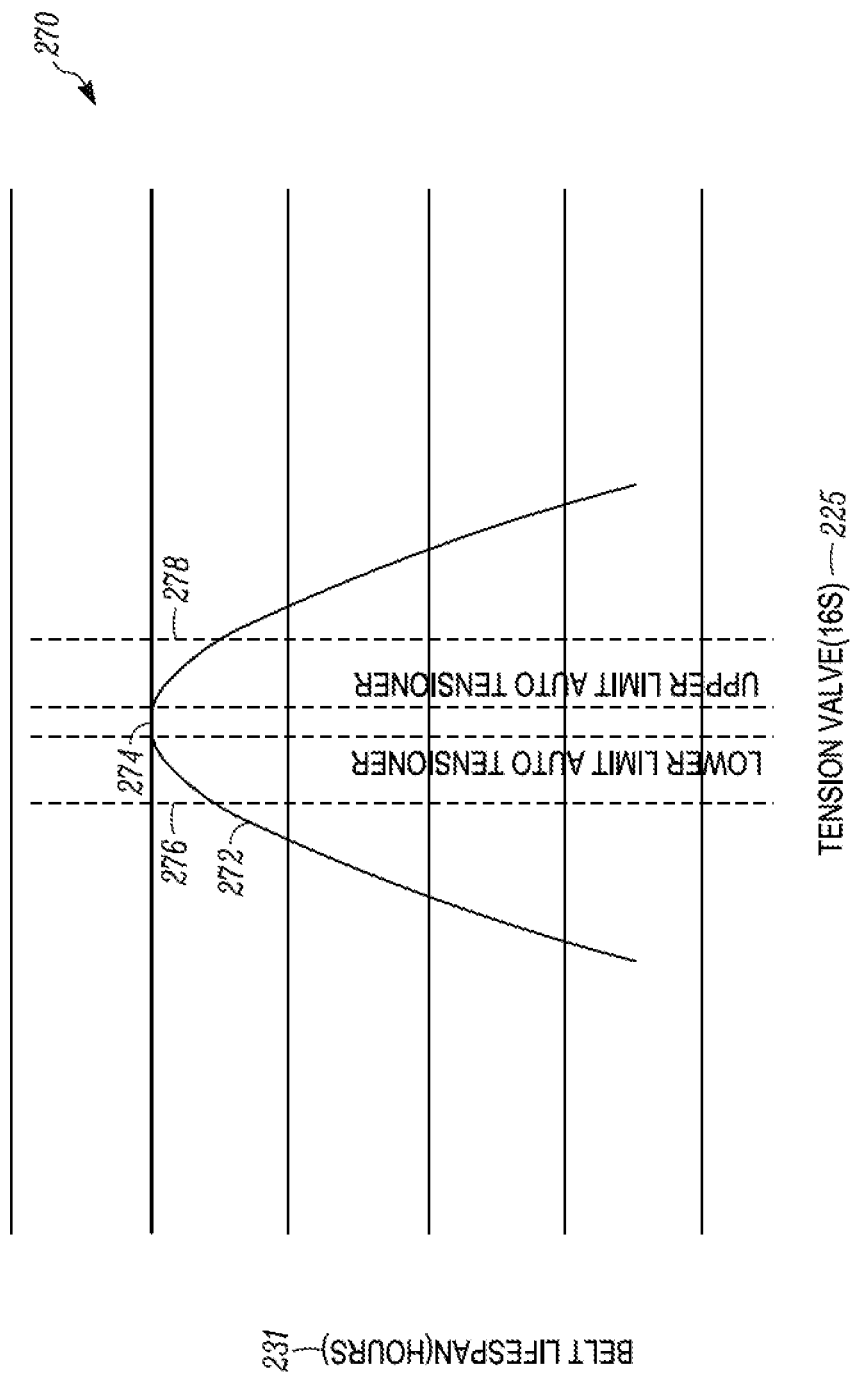
FIG. 11 illustrates a graphical representation of a tension value in relation to a belt lifespan, according to an embodiment.

FIG. 11 illustrates a graphical representation 270 of a tension value 225 in relation to a belt lifespan, according to an embodiment.

The tension value 225 can be derived from the angle of the magnet (theta) and the output voltage, as discussed with respect to FIGS. 8, 9, and 10. As illustrated in FIG. 11, the tension value can be correlated to a belt lifespan 231 in time. The tension value 225 can be measured in units of pounds (lbs), while the belt lifespan 231 can be measured in units of hours (hrs). Although the tension value 225 and belt lifespan 231 are illustrated in FIG. 11 as measured in units of pounds and hours, alternative equivalent units of measurements may be used (e.g., Newtons, minutes, days, etc.).

As illustrated in FIG. 11, the curve 272 of the graphical representation 270 can be in the shape of a parabola; however, alternative curvatures can be formed. The tension value 225 can be directly proportional to the belt lifespan 231. The curve 272 can include a set value 274. The set value 274 can be an ideal tension value 225 at which the belt lifespan 231 and self-tensioner operation is maximized.

In an embodiment, a corresponding belt lifespan can be correlated along the curve 272 to each premeasured tension value 225 among the plurality of historic tension values. The corresponding belt lifespan 231 can be based on a generated curve of historic tension values and time data to determine a remaining belt lifespan 231 against an optimum belt tension. The historic tension values are previously recorded belt tension values that correspond to a remaining belt lifespan (e.g., time) when operating at a particular tension value 225. In other words, the historic tension values are previous premeasured tension values 225 associated with a belt lifespan 231. For example, a high historic tension value can correspond to a shorter belt lifespan.

The tension value 225 can be matched to a historic tension value (e.g., premeasured tension value) on the generated curve 272 to determine a corresponding belt lifespan 231 based on the associated time. The controller can compare the tension value 225 to historic tension values to a find a matching historic tension value. The matching historic tension value can determine a lifespan of the belt in the belt-drive system. The tension value 225 and the belt lifespan 231 are inversely related, such that an increased tension value 225 correlates with a decreased belt lifespan 231. For example, a tension value 225 exceeding a set value 274 may correlate with a decreased belt lifespan 231 (e.g., a higher the tension may cause increased stress, which may lead to quicker belt damage).

In an embodiment, in response to the belt tension condition and/or the corresponding belt lifespan associated with the tension value 225, the tension of the belt can be modified. Adjusting the belt tension can change the tension value 225, thereby changing the belt tension condition and/or the corresponding belt lifespan 231. The change in tension value 225 can thereby increase the belt and/or the self-tensioner lifespan.

In an embodiment, the set value 274 can be used to determine a threshold of tension values. For example, particular deviations from the set value 274 can determine the threshold at which the belt tension 225 can properly provide tension and adequate belt lifespan to the belt. The threshold can include a minimum threshold tension value 276 and a maximum threshold tension value 278 at which the belt may operate without causing damage to the self-tensioner (e.g., 2 in FIGS. 6A-6D and 7A-7D).

The threshold can include a minimum threshold tension value 276 and a maximum threshold tension value 278. The minimum threshold tension value 276 can be a minimum threshold tension value at which a belt may properly function (e.g., belt may not slip off). The maximum threshold tension value 278 can be a maximum threshold tension value at which a belt may properly function (e.g., the belt is not too tight). For example, the tension value 225 can be higher than the minimum threshold tension value 276 so that the belt does not slip off the idler assembly and decrease the belt lifespan. Additionally or alternatively, the tension value 225 can be less than the maximum threshold tension value 278 to prevent excessive force from being applied to the tensioner arm (e.g., 32 in FIGS. 6A-6D) and decreasing the belt lifespan.

When the tension value 225 exceeds the maximum threshold tension value 278, the HMI 209 of FIG. 8 can provide notification. The notification can be an alarm, such as a sound, message, and/or visual alarm, to indicate potential belt failure. A tension value exceeding the maximum threshold tension value 278 indicates an error operating condition. The error operating condition can indicate potential belt failure and/or damage. For example, a tension value 225 exceeding the maximum threshold tension value indicates the tension value 225 is too tight and may not operate properly and/or decrease the belt lifespan in the belt drive system. As such, the notification from the HMI (e.g., 209 shown in FIG. 8) can alert a user to the potential failure (e.g., an error operating condition).

In an embodiment, the belt can be adjusted in response to the error operating condition. The belt tension can be increased or decreased such that the tension value 225 is between the minimum threshold tension value 276 and the maximum threshold tension value 278 of the threshold. The tension value 225 within the threshold indicates a normal operating condition. A normal operating condition (e.g., non-error condition) is when the belt tension and lifespan are adequate; errors in the belt system are unlikely to occur. Adjusting a tension value 225 to be at or close to the set value 274 may provide proper tension to the belt, thereby maintaining or increasing the belt lifespan.

In an embodiment, the threshold can be represented by the indicator (e.g., 200 in FIGS. 6A-6D) on the self-tensioner (e.g., 2 in FIGS. 6A-6D). For example, when visually checking the belt tension via the self-tensioner, if the tension value 225 is between the minimum threshold tension value 276 and the maximum threshold tension value 278, then the indicator can correlate to the green segment of the indicator to alert a user to proper belt tension. Alternatively, if the tension value 225 is not within the threshold (e.g., minimum threshold tension value 276, and maximum threshold tension value 278) the indicator can correlate to the red segment of the indicator to alert a user to improper belt tension.

Figure 12:
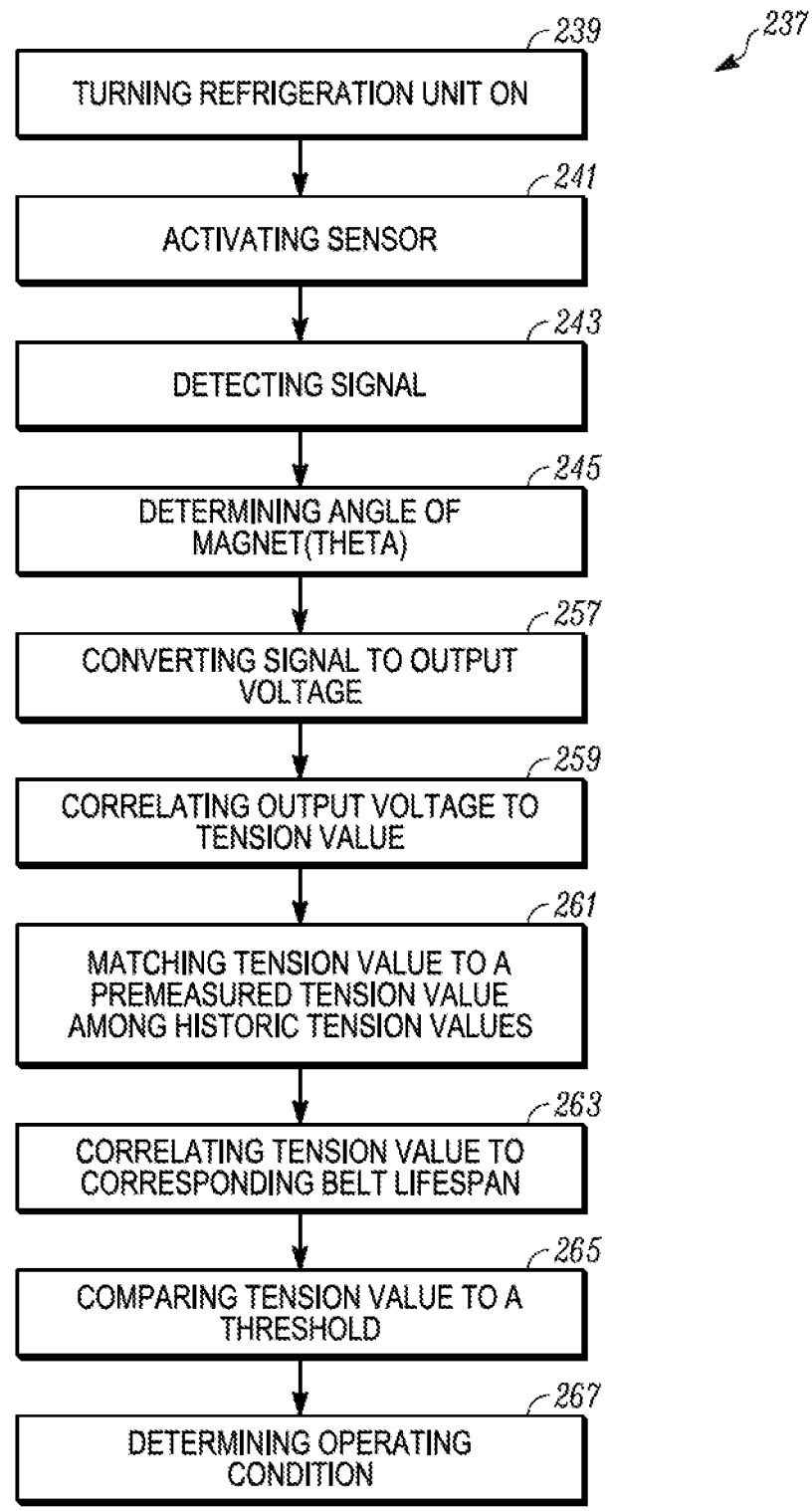
FIG. 12 illustrates a flow diagram for a method for monitoring belt tension and determining belt lifespan, according to an embodiment.

FIG. 12 illustrates a flow diagram for a method 237 of monitoring belt tension and determining belt lifespan, according to an embodiment.

At 239, the refrigeration unit is turned on. Turning the refrigeration unit can provide power to the components, such as a sensor (e.g., 201 in FIGS. 6A-6D). In some embodiments, the refrigeration unit can be turned on automatically or manually. The refrigeration unit can, in some embodiments, receive power from a battery associated with the unit.

At 241, a sensor (e.g., 201 in FIGS. 6A-6D) is activated. The sensor can be the sensor 201 described in FIGS. 6-8. The sensor can be activated to check a belt tension and/or belt tension condition of the belt drive system. In an embodiment, the sensor can be activated to check the belt tension condition before unit startup. Unit startup activates operation of the transport refrigeration unit (TRU). Checking the belt condition prior to unit startup can prevent additional noise and vibration from tainting the signal, as discussed previously herein with respect to FIG. 8.

At 243, the method 237 includes the sensor detecting a signal. The signal can be movement of the tensioner arm in the self-tensioner. The tensioner arm may move in response to a force from a belt in the belt drive system, as previously discussed herein.

At 245, the method 237 determines an angle of a magnet that passes over the sensor. The angle of the magnet is can be measured in degrees (theta). The magnet used to pass over the sensor can move with respect to the sensor and form an angle. As previously discussed herein with respect to FIG. 8, the orientation of the sensor can be stationary, while the position of the magnet can translate to 45 degrees and remain within a linear slope of the output voltage for position sensing.

At 257, the signal and angle of the magnet is converted to an output voltage. The sensor can use anisotropic magneto-resistive (AMR) technology and can determine a difference of resistance (R) on the bridge (e.g., legs) of the sensor when the magnet is passed over the sensor. The signal can be converted to an output voltage as discussed previously herein with respect to FIGS. 8-10.

At 259, the output voltage is correlated to a tension value. The output voltage can be used to derive a tension value. The tension value can be stored, via the controller, among a plurality of historic tension values (e.g., premeasured tension values). The tension value can represent the belt tension in the belt driven system, as previously described herein.

At 261, the method 237 includes matching the tension value to a premeasured tension value among historic tension values. The tension value can be matched to a premeasured tension value when the tension value and the premeasured tension value are the same. In some embodiments, the tension value can be matched to the premeasured tension value when the premeasured tension values are within a particular range (e.g., +/−5% of the tension value).

At 263, the tension value is correlated to a corresponding belt lifespan. In an embodiment, a data curve can be generated for remaining belt lifespan via historical tension values and time data. The tension value can be correlated a point on the data curve. The matching premeasured tension value can have a corresponding belt tension lifespan. The belt tension lifespan can indicate the amount of life (e.g., time) remaining for the belt when operating at the particular tension value. The tension value may predict a belt lifespan of the self-tensioner based on the corresponding point on the data curve, as previously discussed herein.

At 265, the method 237 includes comparing the tension value to a threshold. The threshold can include a set value, a minimum threshold tension value, and a maximum threshold tension value. The set value can be determined from the plurality of historic tension values. The set value can represent a particular tension value at which the belt in the belt drive system can correspond to the longest belt lifespan and operate without error (e.g., normal condition). In an embodiment, the threshold can be predetermined and/or based on the set value.

At 267, the method 237 includes determining the belt tension condition. The belt tension condition can be a normal belt tension condition or an error belt tension condition. A tension value between the minimum threshold tension value and the maximum threshold tension threshold value can indicate normal operating condition (e.g., non-error operating condition). The normal operating condition can indicate the belt tension and corresponding belt lifespan is adequate. The tension value within the threshold can indicate the belt is not subject to error. The unit can be started under normal belt tension conditions and the power to the sensor (e.g., 201 in FIGS. 6A-6D) can be turned off.

If the tension value is outside the threshold, the belt may be operating in an error belt tension condition. A controller (e.g., the controller 135 as shown in FIG. 8) can transmit the operating condition to an HMI, which can provide a notification. The notification can be an alarm and/or a visual alert. The notification can notify a user, such as an operator, maintenance, or the like, that the belt tension may produce an error in the self-tensioner. For example, the tension value may exceed the maximum threshold tension value, indicating improper belt tension, and may cause damage to the unit when under operation. An alarm or a notification on the HMI can be provided, as previously described herein.

In some embodiments, a tension value can be adjusted in response to the notification indicating the tension value outside of the threshold (e.g., error operating condition). For example, in response to a notification that the tension value is less than the minimum threshold tension value, the tension value can be increased. The tension value increase can place the tension value within the threshold and in a normal belt tension condition.

Monitoring belt tension and determining belt lifespan in a transport refrigeration unit (TRU) can be useful for identifying and/or predicting belt failure in the unit. Monitoring belt tension can be used to predict an estimated remaining belt life associated with the belt in the unit, which may be used to minimize unit down time (e.g., non-operating time). Monitoring belt tension and/or an associated belt lifespan can provide information for optimized belt tension. Such information may be used to improve drive efficiency, which may reduce costs and reduce repair/maintenance time.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

Aspects:

It is to be appreciated that any of aspects 1-10 can be combined with any of aspects 11-15 and 16-20. Aspects 11-15 can be combined with any of aspects 16-20.

Aspect 1. A self-tensioner system, comprising:
a belt driven system that includes a self-tensioner and a belt;
a sensor connected to the self-tensioner;
a magnet that passes over the sensor to generate a signal, wherein the sensor detects the signal, and the signal in conjunction with an angle of the magnet is converted into a voltage value; and
a controller connected to the self-tensioner, wherein the controller receives the voltage value, converts the voltage value into a tension value, and stores the tension value among a plurality of premeasured tension values in a memory, wherein the controller compares the tension value and the plurality of premeasured tension values to determine a belt tension condition of the belt in the belt-driven system.

Aspect 2. The system of aspect 1, wherein the plurality of premeasured tension values each have a corresponding belt lifespan, and the tension value is directly proportional to the corresponding belt lifespan.

Aspect 3. The system of either of aspects 1 and 2, wherein the memory stores a corresponding belt lifespan for each premeasured tension value among the plurality of premeasured tension values, and wherein the corresponding belt lifespan is based on a generated curve with a plurality of historic belt tensions and time data to determine a remaining belt lifespan against an optimum belt tension.

Aspect 4. The system of aspect 3, wherein the controller matches the tension value to a historic belt tension on the generated curve to determine a corresponding belt lifespan based on the associated time.

Aspect 5. The system of any one of aspects 1-4, wherein the belt tension condition is based on the tension value relative to a threshold, the threshold includes a minimum threshold tension value and a maximum threshold tension value.

Aspect 6. The system of aspect 5, wherein when the belt tension condition is outside of the threshold, the controller indicates an error operating condition, wherein the error operating condition indicates a potential belt failure of the belt and triggers an alarm when the tension value is less than the minimum threshold tension value or more than the maximum threshold tension value, and wherein the alarm indicates an improper tension and potential damage to the belt driven system.

Aspect 7. The system of either of aspects 5 or 6, wherein when the tension value is within the threshold or is less than or equal to a set value, the controller activates unit startup and the sensor is deactivated.

Aspect 8. The system of any one of aspects 1-7, wherein the sensor detects the signal based on a direction of movement of the tensioner arm.

Aspect 9. The system of aspect 8, wherein the signal is converted via signal conversion into the voltage value with respect to a direction of magnetic flux that passes over the sensor, and the signal is matched to a particular degree (theta).

Aspect 10. The self-tensioner system of any one of aspects 1-9, wherein the self-tensioner system adjusts the belt in response to the belt tension condition.

Aspect 11. A method for monitoring belt tension, comprising:

detecting, by a sensor connected to a self-tensioner, a signal and an angle of a magnet;

converting the signal and angle of the magnet into a voltage value;

converting, via a controller, the voltage value into a tension value;

storing the tension value among a plurality of premeasured tension values;

generating a data curve for a remaining belt lifespan based on the tension value, the plurality of premeasured tension values, and time data;

corresponding the tension value to a point on the data curve; and predicting a belt lifespan of the self-tensioner based on the corresponding point on the data curve.

Aspect 12. The method of aspect 11, further comprising checking for noise and vibration when detecting the belt tension value.

Aspect 13. The method of either of aspects 11 or 12, wherein the sensor is powered by a battery connected to a transport refrigeration unit.

Aspect 14. The method of any one of aspects 11-13, wherein the tension value is a voltage value that is translated from the movement of the tensioner arm of the self-tensioner to the sensor.

Aspect 15. The method of any one of aspects 11-14, wherein the tension value and a belt lifespan are inversely related, such that an increased tension value correlates with a decreased belt lifespan.

Aspect 16. A self-tensioner system, comprising:

a belt driven system that includes a self-tensioner and a belt, wherein the self-tensioner includes a tensioner arm;

a sensor connected to the self-tensioner;

a magnet that passes over the sensor that creates a signal from the tensioner arm that is detected by the sensor; and a controller connected to the sensor to receive the signal from the sensor and convert the signal into a tension value associated with the belt in the belt driven system, wherein the controller stores the tension value among a plurality of historic tension values and a corresponding belt lifespan in a memory, wherein the controller compares the tension value and a threshold to determine a belt tension condition of the belt driven system, and wherein the controller compares the tension value and the plurality of historic tension values to determine a lifespan of the belt in the belt-driven system.

Aspect 17. The self-tensioner system of aspect 16, wherein the threshold and a set value is determined from a plurality of premeasured tension values.

Aspect 18. The self-tensioner system of aspect 17, wherein when the tension value exceeds the threshold, the controller initiates an alarm to indicate a deviation belt tension condition.

Aspect 19. The self-tensioner system of any one of aspects 16-18, wherein the sensor is a surface mount sensor and converts the signal, based on movement of the tensioner arm, to an output voltage with respect to a direction of a magnetic flux.

Aspect 20. The self-tensioner system of any one of aspects 16-19, wherein the sensor is activated prior to a unit start-up and prevents vibrational affects upon the signal.

What is claimed is:

1. A self-tensioner system, comprising:
  a belt driven system that includes a self-tensioner and a belt;
  a sensor connected to the self-tensioner;
  a magnet that passes over the sensor to generate a signal, wherein the sensor detects the signal, and the signal in conjunction with an angle of the magnet is converted into a voltage value; and
  a controller connected to the self-tensioner, wherein the controller receives the voltage value, converts the voltage value into a tension value, and stores the tension value among a plurality of premeasured tension values in a memory,
  wherein the controller compares the tension value and the plurality of premeasured tension values to determine a belt tension condition of the belt in the belt-driven system.

2. The system of claim 1, wherein the plurality of premeasured tension values each have a corresponding belt lifespan, and the tension value is directly proportional to the corresponding belt lifespan.

3. The system of claim 1, wherein the memory stores a corresponding belt lifespan for each premeasured tension value among the plurality of premeasured tension values, and wherein the corresponding belt lifespan is based on a generated curve with a plurality of historic belt tensions and time data to determine a remaining belt lifespan against an optimum belt tension.

4. The system of claim 3, wherein the controller matches the tension value to a historic belt tension on the generated curve to determine a corresponding belt lifespan based on the associated time.

5. The system of claim 1, wherein the belt tension condition is based on the tension value relative to a threshold, the threshold includes a minimum threshold tension value and a maximum threshold tension value.

6. The system of claim 5, wherein when the belt tension condition is outside of the threshold, the controller indicates an error operating condition,
wherein the error operating condition indicates a potential belt failure of the belt and triggers an alarm when the tension value is less than the minimum threshold tension value or more than the maximum threshold tension value, and
wherein the alarm indicates an improper tension and potential damage to the belt driven system.

7. The system of claim 5, wherein when the tension value is within the threshold or is less than or equal to a set value, the controller activates unit startup and the sensor is deactivated.

8. The system of claim 1, wherein the sensor detects the signal based on a direction of movement of the tensioner arm.

9. The system of claim 8, wherein the signal is converted via signal conversion into the voltage value with respect to a direction of magnetic flux that passes over the sensor, and the signal is matched to a particular degree (theta).

10. The self-tensioner system of claim 1, wherein the self-tensioner system adjusts the belt in response to the belt tension condition.

11. A method for monitoring belt tension, comprising:
detecting, by a sensor connected to a self-tensioner, a signal and an angle of a magnet;
converting the signal and angle of the magnet into a voltage value;
converting, via a controller, the voltage value into a tension value;
storing the tension value among a plurality of premeasured tension values;
generating a data curve for a remaining belt lifespan based on the tension value, the plurality of premeasured tension values, and time data;
corresponding the tension value to a point on the data curve; and
predicting a belt lifespan of the self-tensioner based on the corresponding point on the data curve.

12. The method of claim 11, further comprising checking for noise and vibration when detecting the belt tension value.

13. The method of claim 11, wherein the sensor is powered by a battery connected to a transport refrigeration unit.

14. The method of claim 11, wherein the tension value is a voltage value that is translated from the movement of the tensioner arm of the self-tensioner to the sensor.

15. The method of claim 11, wherein the tension value and a belt lifespan are inversely related, such that an increased tension value correlates with a decreased belt lifespan.

16. A self-tensioner system, comprising:
a belt driven system that includes a self-tensioner and a belt, wherein the self-tensioner includes a tensioner arm;
a sensor connected to the self-tensioner;
a magnet that passes over the sensor that creates a signal from the tensioner arm that is detected by the sensor; and
a controller connected to the sensor to receive the signal from the sensor and convert the signal into a tension value associated with the belt in the belt driven system,
wherein the controller stores the tension value among a plurality of historic tension values and a corresponding belt lifespan in a memory,
wherein the controller compares the tension value and a threshold to determine a belt tension condition of the belt driven system, and
wherein the controller compares the tension value and the plurality of historic tension values to determine a lifespan of the belt in the belt-driven system.

17. The self-tensioner system of claim 16, wherein the threshold and a set value is determined from a plurality of premeasured tension values.

18. The self-tensioner system of claim 17, wherein when the tension value exceeds the threshold, the controller initiates an alarm to indicate a deviation belt tension condition.

19. The self-tensioner system of claim 16, wherein the sensor is a surface mount sensor and converts the signal, based on movement of the tensioner arm, to an output voltage with respect to a direction of a magnetic flux.

20. The self-tensioner system of claim 16, wherein the sensor is activated prior to a unit start-up and prevents vibrational affects upon the signal.

* * * * *